United States Patent
Itamoto et al.

(10) Patent No.: US 9,821,836 B2
(45) Date of Patent: Nov. 21, 2017

(54) ELECTRIC POWER STEERING SYSTEM

(71) Applicant: JTEKT CORPORATION, Osaka-shi, Osaka (JP)

(72) Inventors: Hidenori Itamoto, Tajimi (JP); Terutaka Tamaizumi, Okazaki (JP); Shingo Maeda, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 56 days.

(21) Appl. No.: 14/847,388

(22) Filed: Sep. 8, 2015

(65) Prior Publication Data
US 2016/0075370 A1 Mar. 17, 2016

(30) Foreign Application Priority Data
Sep. 16, 2014 (JP) .................................. 2014-187993

(51) Int. Cl.
*B62D 5/04* (2006.01)
*B62D 6/02* (2006.01)
*B62D 6/04* (2006.01)

(52) U.S. Cl.
CPC ......... *B62D 5/0463* (2013.01); *B62D 5/0409* (2013.01); *B62D 5/0466* (2013.01); (Continued)

(58) Field of Classification Search
CPC .......... B62D 6/02; B62D 6/04; B62D 5/0466; B62D 5/0463; B62D 5/0484; B62D 5/0493; B62D 5/0409
See application file for complete search history.

(56) References Cited

U.S. PATENT DOCUMENTS

2008/0294313 A1* 11/2008 Aoki .................... B62D 5/0463
701/43
2011/0054742 A1* 3/2011 Yamashita ........... B62D 5/0463
701/43
(Continued)

FOREIGN PATENT DOCUMENTS

| JP | 2010-155598 A | 7/2010 |
| JP | 2012-240440 A | 12/2012 |
| JP | 5381536 B2 | 1/2014 |

OTHER PUBLICATIONS

Machine Translation of JP 2010-155598 retrieved from Espacenet on Dec. 26, 2016.*

(Continued)

*Primary Examiner* — Thomas Ingram
(74) *Attorney, Agent, or Firm* — Oliff PLC

(57) ABSTRACT

Restriction values (upper limit and lower limit) for an assist control amount are set individually for each of state amounts including steering torque $\tau$ used to compute the assist control amount. A value obtained by summing such restriction values is set as a final restriction value for the assist control amount. Even though the assist control amount with an abnormal value is computed, the assist control amount is restricted to an appropriate value by the final restriction value. In addition, a transition is made from a primary assist control amount which is restricted to a secondary assist control amount computed separately from the primary assist control amount at the timing when a certain time elapses since the assist control amount is restricted. As the steering torque $\tau$ is increased, the speed of transition from the primary assist control amount to the secondary assist control amount is increased.

19 Claims, 21 Drawing Sheets

(52) U.S. Cl.
CPC ......... *B62D 5/0484* (2013.01); *B62D 5/0493* (2013.01); *B62D 6/02* (2013.01); *B62D 6/04* (2013.01)

(56) References Cited

U.S. PATENT DOCUMENTS

| | | | |
|---|---|---|---|
| 2014/0041958 A1* | 2/2014 | Iijima | B62D 5/0463 180/446 |
| 2014/0180544 A1 | 6/2014 | Itamoto et al. | |
| 2014/0188337 A1* | 7/2014 | Pyo | B62D 5/0463 701/41 |
| 2015/0088383 A1* | 3/2015 | Kodato | B62D 6/007 701/41 |
| 2015/0375779 A1* | 12/2015 | Varunjikar | B62D 5/0472 701/41 |

OTHER PUBLICATIONS

Feb. 23, 2016 Search Report issued in European Patent Application No. 15185317.3.

\* cited by examiner

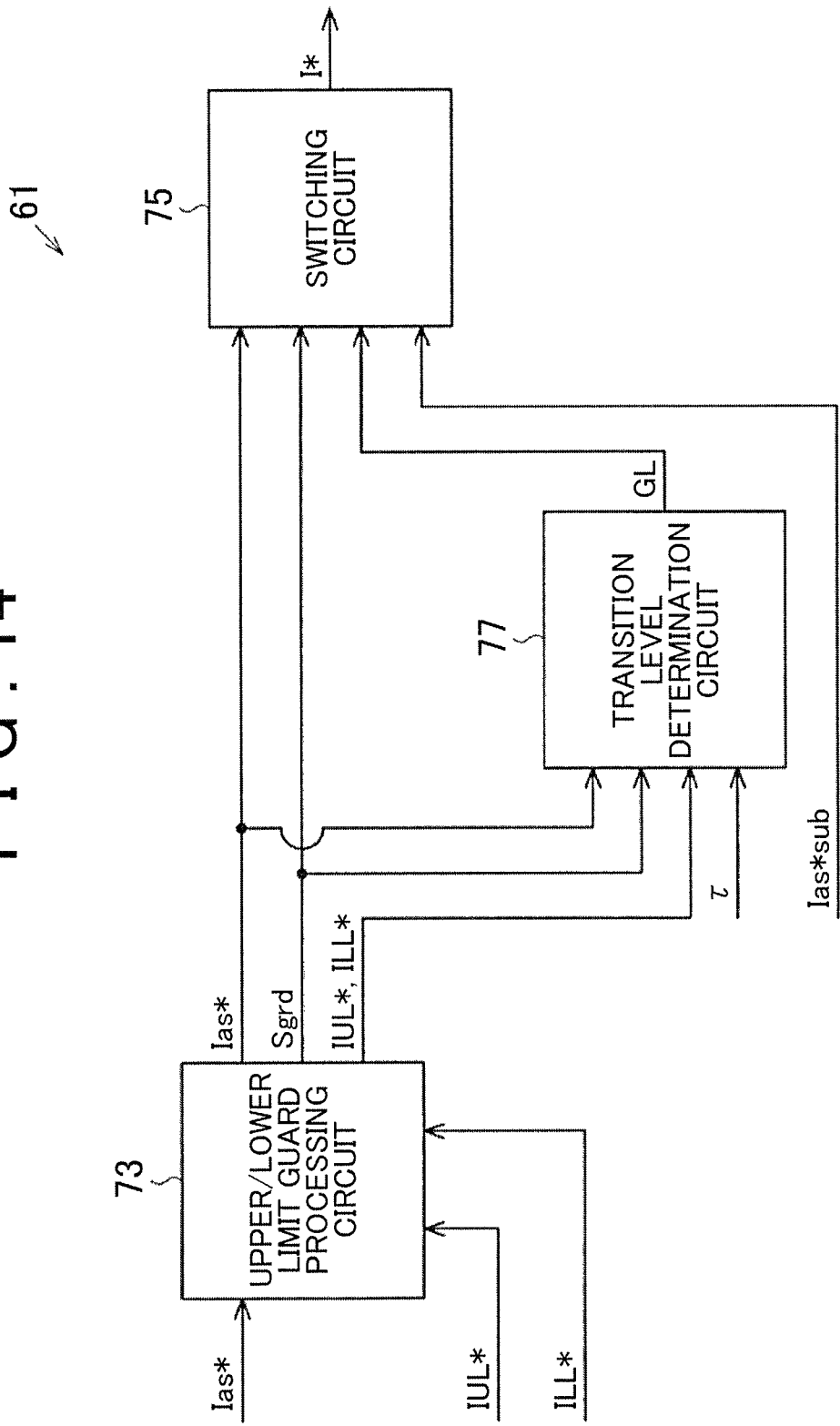

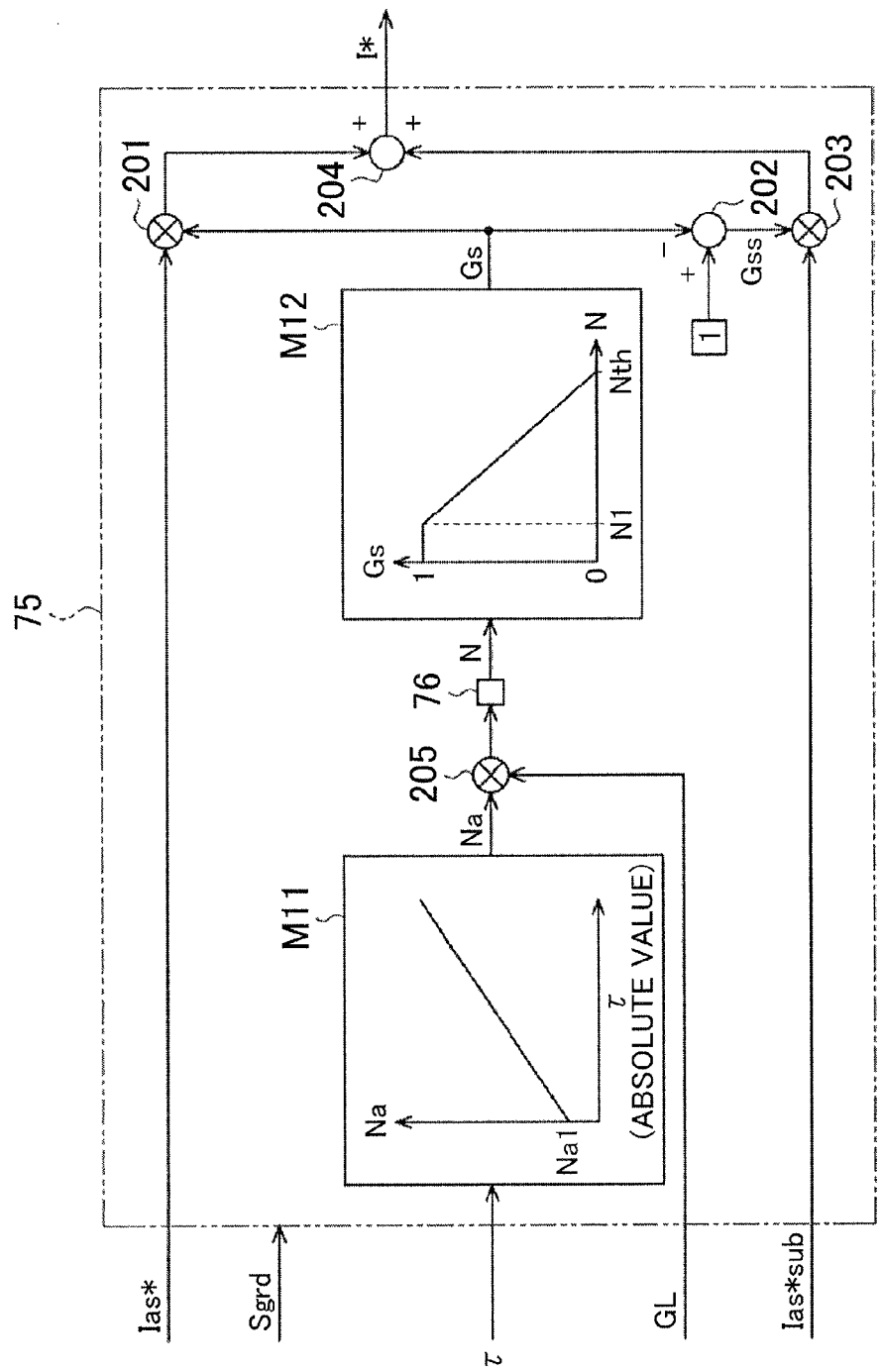

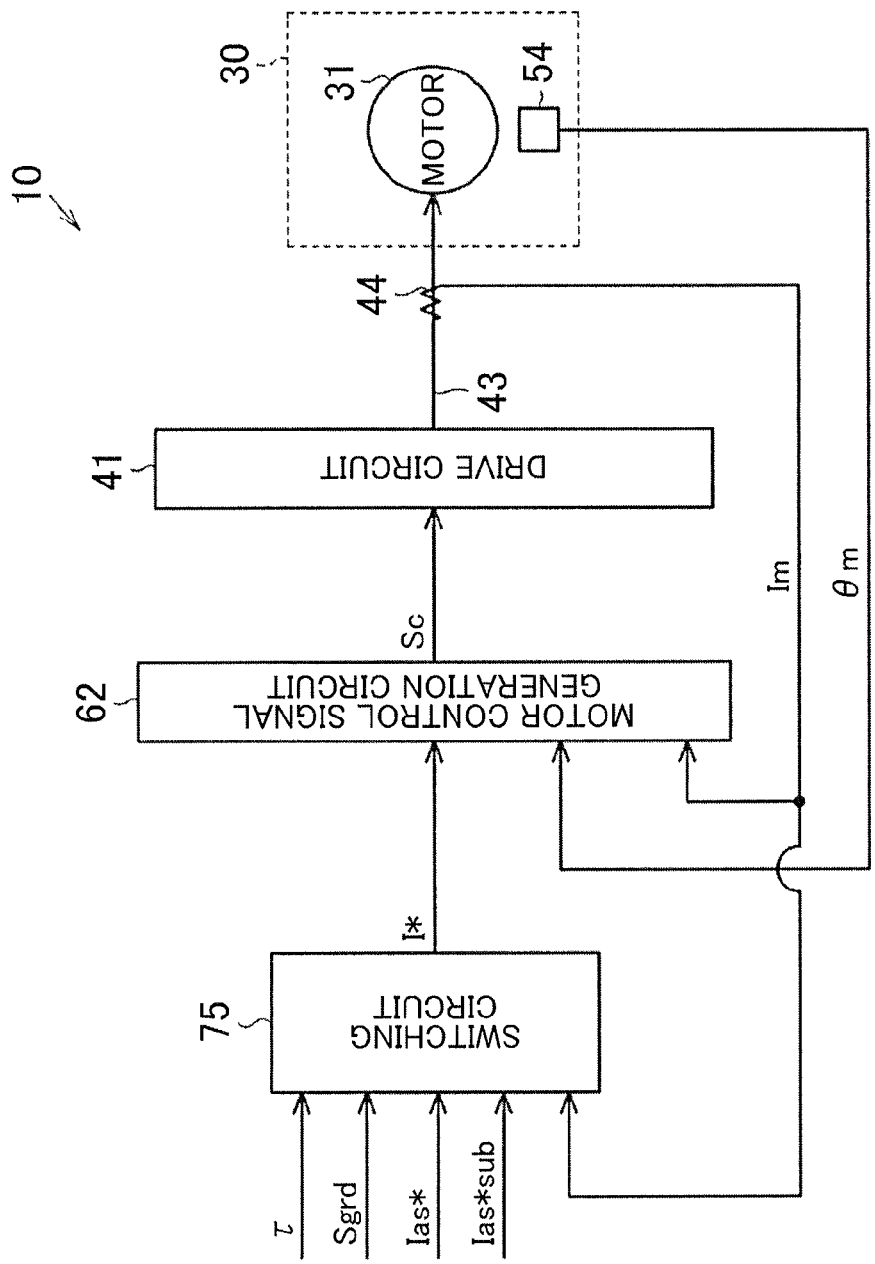

FIG. 19

| PATTERN | D1 | D2 | D3 | D4 |
|---|---|---|---|---|
| DIRECTION OF VARIATION IN STEERING TORQUE $\tau$ (VARIATION VALUE $\Delta\tau$) | + | + | − | − |
| DIRECTION OF VARIATION IN CURRENT VALUE Im (VARIATION VALUE $\Delta$Im) | + | − | + | − |
| $\Delta\tau \times \Delta$Im | + | − | − | + |
| IS CURRENT IN DIRECTION OF INCREASING VARITIONS IN STEERING TORQUE? | NO | YES | YES | NO |
| TRANSITION SPEED GAIN GV | GVL | GVH | GVH | GVL |

GVL<1 (OR GVL=1)
GVH>1

ELECTRIC POWER STEERING SYSTEM

INCORPORATION BY REFERENCE

The disclosure of Japanese Patent Application No. 2014-187993 filed on Sep. 16, 2014 including the specification, drawings and abstract, is incorporated herein by reference in its entirety.

BACKGROUND OF THE INVENTION

1. Field of the Invention

The present invention relates to an electric power steering system.

2. Description of the Related Art

Japanese Patent Application Publication No. 2010-155598 (JP 2010-155598 A) describes an electric power steering system (hereinafter referred to as an "EPS") that applies torque of a motor to a steering mechanism of a vehicle to assist a driver in performing a steering operation. The EPS performs feedback control for a motor current in order to generate an appropriate assist force that matches at least steering torque. That is, the EPS adjusts the voltage applied to the motor through adjustment of the duty of PWM control in order to reduce the difference between an assist current command value computed on the basis of at least the steering torque and a motor current detection value.

Because higher safety is required for the EPS, the EPS according to JP 2010-155598 A adopts the following configuration. That is, when the steering torque and the assist current command value coincide with each other in direction, the EPS restricts the assist current command value to a determined upper limit value or lower limit value. When the steering torque and the assist current command value are opposite to each other in direction, in contrast, the EPS determines that an abnormality has occurred in assist control computation, and restricts the assist current command value to zero.

However, the EPS according to JP 2010-155598 A involves the following concern. That is, the EPS according to JP 2010-155598 A cannot restrict the assist current command value to zero when the steering torque is in a range of small values (a certain positive and negative range around 0). In general, the assist current command value is generated by superimposing a compensation amount for adjusting the behavior of steering on a fundamental component based on the steering torque. However, the compensation amount may not coincide with the direction of the steering torque. In the case where the steering torque is large, the compensation amount is canceled by the fundamental component even if the compensation amount does not coincide with the steering torque in direction. Therefore, the assist current command value itself coincides with the steering torque in direction. Thus, a disagreement in direction between the assist current command value and the steering torque can be considered as an abnormality in assist control computation.

When the steering torque is in a range of small values, however, the fundamental component is smaller, and the proportion of the compensation amount in the assist current command value is larger. Therefore, the assist current command value and the steering torque may not coincide with each other in direction even if the assist control computation is normal. If the assist current command value is restricted to zero in such a case, the behavior of steering may not be adjusted. Thus, in the EPS according to JP 2010-155598 A, the assist current command value is not restricted to zero when the steering torque is in a range of small values, and the assist current command value is restricted within a range with such a margin that the compensation amount is not restricted. Therefore, even if an abnormal assist current command value is erroneously derived through computation because of some factors, there is less strict restriction on the assist current command value in a region in which the steering torque is small. Therefore, an unintentional assist force is applied to the steering mechanism to occasionally cause self-assist.

SUMMARY OF THE INVENTION

It is an object of the present invention to provide an electric power steering system capable of applying an appropriate assist force to a steering system.

An aspect of the present invention provides an electric power steering system, including:

a control device that computes an assist control amount on the basis of a plurality of types of state amounts indicating a steering state of a steering system, and that controls a motor that serves as a generation source of an assist force to be applied to a steering mechanism of a vehicle on the basis of the assist control amount, in which the control device executes a restriction process of setting a restriction value with which a variation range of the assist control amount is restricted, individually for each of the state amounts, in accordance with each state amount used to compute the assist control amount, and of restricting a value of the assist control amount using the restriction value, and a switching process for causing the assist control amount to transit from a first assist control amount, which is the restricted assist control amount, to a second assist control amount, which is computed separately from the first assist control amount, at a timing when a certain time elapses since the value of the assist control amount is restricted, and the control device varies a speed of transition from the first assist control amount to the second assist control amount on the basis of an internal state of the control device.

With the electric power steering system according to the aspect described above, it is possible to apply an appropriate assist force to a steering system.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 14 is a control block diagram illustrating an essential portion of a current command value computation circuit according to a second embodiment;

FIG. 15 is a control block diagram of a switching circuit according to the second embodiment;

FIG. 17 is a control block diagram illustrating an essential portion of an electric power steering system according to a third embodiment;

FIG. 19 is a table illustrating a transition level determination map according to the third embodiment;

DETAILED DESCRIPTION OF EMBODIMENTS

Figure 1:
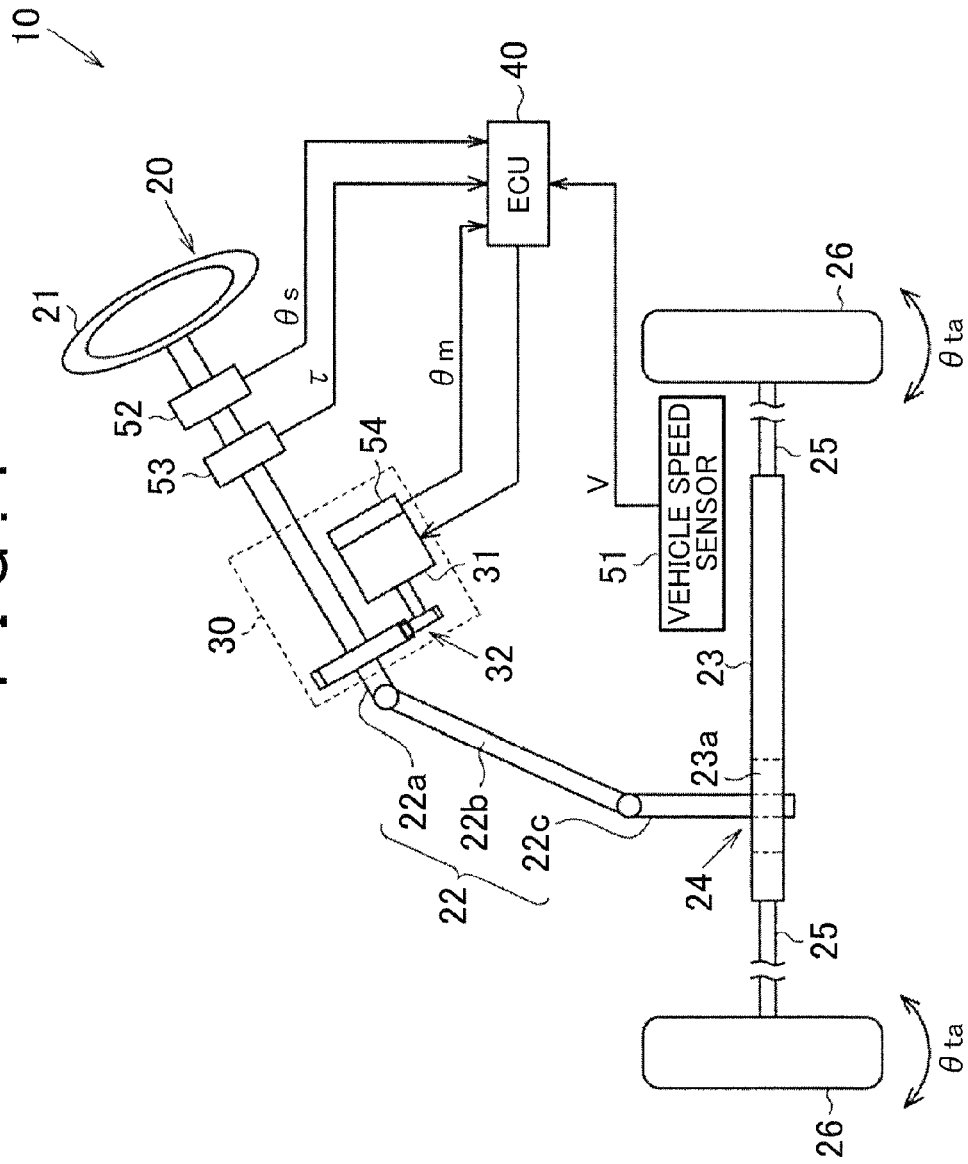
FIG. 1 illustrates a schematic configuration of an electric power steering system according to a first embodiment.

An electric power steering system according to a first embodiment of the present invention will be described below. As illustrated in FIG. 1, an electric power steering system 10 includes a steering mechanism 20 that steers steered wheels on the basis of a steering operation performed by a driver, a steering assist mechanism 30 that assists the driver in performing a steering operation, and an electronic control unit (ECU) 40 that controls operation of the steering assist mechanism 30.

The steering mechanism 20 includes a steering wheel 21 operated by the driver, and a steering shaft 22 that rotates together with the steering wheel 21. The steering shaft 22 is composed of a column shaft 22a coupled to the center of the steering wheel 21, an intermediate shaft 22b coupled to the lower end portion of the column shaft 22a, and a pinion shaft 22c coupled to the lower end portion of the intermediate shaft 22b. The lower end portion of the pinion shaft 22c meshes with a rack shaft 23 (to be exact, a portion 23a on which rack teeth are formed) that extends in a direction that crosses the pinion shaft 22c. Thus, rotational motion of the steering shaft 22 is converted into reciprocal linear motion of the rack shaft 23 by a rack-and-pinion mechanism 24 composed of the pinion shaft 22c and the rack shaft 23. The reciprocal linear motion is transferred to right and left steered wheels 26 and 26 via tie rods 25 coupled to both ends of the rack shaft 23 to change a steered angle θta of the steered wheels 26 and 26.

The steering assist mechanism 30 includes a motor 31 that serves as a generation source for a steering assist force. A brushless motor or the like is adopted as the motor 31. The motor 31 is coupled to the column shaft 22a via a speed reduction mechanism 32. The speed reduction mechanism 32 reduces the speed of rotation output from the motor 31, and transfers a rotational force at the reduced speed to the column shaft 22a. That is, torque of the motor is applied to the steering shaft 22 as a steering assist force (assist force) to assist the driver in performing a steering operation.

The ECU 40 acquires the results of detection performed by various sensors provided in the vehicle as information indicating a request from the driver or the travel state, and controls the motor 31 in accordance with the acquired various information.

Examples of the various sensors include a vehicle speed sensor 51, a steering sensor 52, a torque sensor 53, and a rotational angle sensor 54. The vehicle speed sensor 51 detects a vehicle speed (travel speed of the vehicle) V. The steering sensor 52 is a magnetic rotational angle sensor, for example, provided to the column shaft 22a to detect a steering angle θs. The torque sensor 53 is provided to the column shaft 22a to detect steering torque τ. The rotational angle sensor 54 is provided to the motor 31 to detect a rotational angle θm of the motor 31.

The ECU 40 computes a target assist force on the basis of the vehicle speed V, the steering angle θs, the steering torque τ, and the rotational angle θm, and supplies the motor 31 with drive electric power for causing the steering assist mechanism 30 to generate the target assist force.

Figure 2:
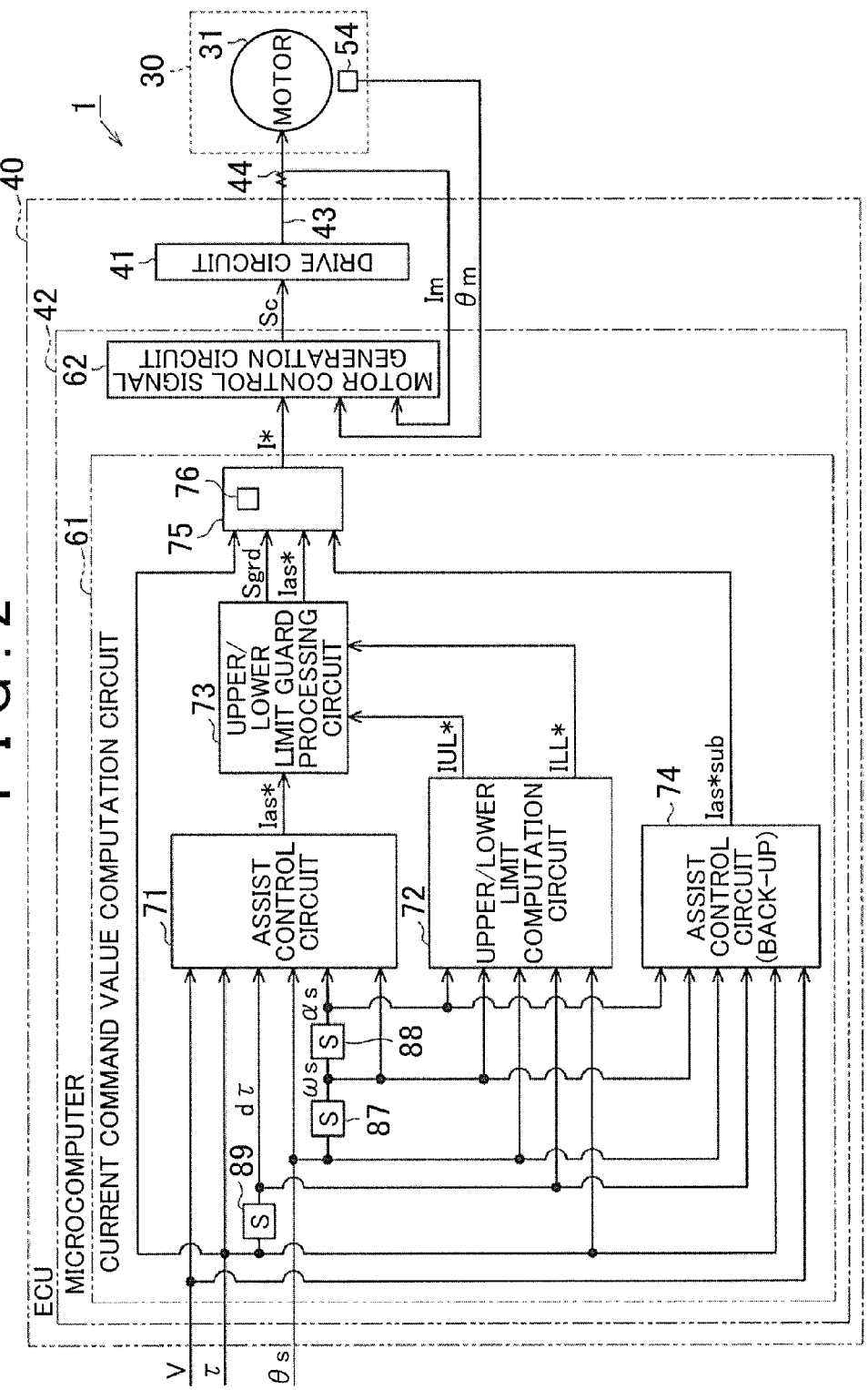
FIG. 2 is a control block diagram of the electric power steering system according to the first embodiment.

Next, the hardware configuration of the ECU will be described. As illustrated in FIG. 2, the ECU 40 includes a drive circuit (inverter circuit) 41 and a microcomputer 42.

The drive circuit 41 converts DC power supplied from a DC power source such as a battery into three-phase AC power on the basis of a motor control signal Sc (PWM drive signal) generated by the microcomputer 42. The resulting three-phase AC power is supplied to the motor 31 via a power supply path 43 for each phase. A current sensor 44 is provided in the power supply path 43 for each phase. The current sensor 44 detects an actual current value Im of a current that flows through the power supply path 43 for each phase. In FIG. 2, for convenience of description, the power supply paths 43 for the respective phases and the current sensors 44 for the respective phases are illustrated collectively.

The microcomputer 42 retrieves the results of detection performed by the vehicle speed sensor 51, the steering sensor 52, the torque sensor 53, the rotational angle sensor 54, and the current sensor 44 at prescribed sampling periods. The microcomputer 42 generates the motor control signal Sc on the basis of the retrieved detection results, that is, the vehicle speed V, the steering angle θs, the steering torque τ, the rotational angle θm, and the actual current value Im.

Next, the functional configuration of the microcomputer will be described. The microcomputer 42 has various computation processing circuits achieved by executing a control program stored in a storage device (not illustrated).

As illustrated in FIG. 2, the microcomputer 42 includes a current command value computation circuit 61 and a motor control signal generation circuit 62 as the computation processing circuits. The current command value computation circuit 61 computes a final current command value I* on the basis of the steering torque τ, the vehicle speed V, and the steering angle θs. The final current command value I* is a command value that indicates a current to be supplied to the motor 31. To be exact, the final current command value I* includes a q-axis current command value and a d-axis current command value in a d/q coordinate system. In the embodiment, the d-axis current command value is set to zero. The d/q coordinate system is used to define rotational coordinates based on the rotational angle θm of the motor 31. The motor control signal generation circuit 62 converts the current value Im for the three phases of the motor 31 into vector components for two phases, that is, a d-axis current value and a q-axis current value in the d/q coordinate system, using the rotational angle θm. Then the motor control signal generation circuit 62 calculates a deviation between the d-axis current value and the d-axis current command value and a deviation between the q-axis current value and the q-axis current command value, and generates the motor control signal Sc so as to eliminate such deviations.

Next, the current command value computation circuit will be described. As illustrated in FIG. 2, the current command value computation circuit 61 includes a primary assist control circuit 71, an upper/lower limit computation circuit 72, an upper/lower limit guard processing circuit 73, a secondary assist control circuit 74, and a switching circuit 75. In addition, the current command value computation circuit 61 includes three differentiators 87, 88, and 89.

The differentiator 87 differentiates the steering angle θs to compute a steering speed ωs. The differentiator 88 further differentiates the steering speed ωs calculated by the differentiator 87 in the preceding stage to compute a steering angle acceleration αs. The differentiator 89 differentiates the steering torque τ with respect to the time to compute a steering torque differential value dτ.

The primary assist control circuit 71 computes an assist control amount Ias* (hereinafter referred to as a "primary assist control amount") on the basis of the steering torque τ, the vehicle speed V, the steering angle θs, the steering speed ωs, the steering angle acceleration αs, and the steering torque differential value dτ. The primary assist control amount Ias* is a value (current value) of a current to be supplied to the motor 31 in order to generate a target assist force with an appropriate magnitude that matches the various state amounts.

The upper/lower limit computation circuit 72 computes an upper limit value IUL* and a lower limit value ILL*, which serve as restriction values for the primary assist control amount Ias*, on the basis of various signals used in the primary assist control circuit 71 such as the steering torque τ, the steering angle θs, the steering torque differential value dτ, the steering speed ωs, and the steering angle acceleration αs. The upper limit value IUL* and the lower limit value ILL* are used as the final restriction values for the primary assist control amount Ias*.

The upper/lower limit guard processing circuit 73 executes a process for restricting the primary assist control amount Ias* on the basis of the upper limit value IUL* and the lower limit value ILL* computed by the upper/lower limit computation circuit 72. That is, the upper/lower limit guard processing circuit 73 compares the value of the primary assist control amount Ias* and the upper limit value IUL* and the lower limit value ILL*. The upper/lower limit guard processing circuit 73 restricts the primary assist control amount Ias* to the upper limit value IUL* in the case where the primary assist control amount Ias* exceeds the upper limit value IUL*, and restricts the primary assist control amount Ias* to the lower limit value ILL* in the case where the primary assist control amount Ias* falls below the lower limit value ILL*. The primary assist control amount Ias* which has been subjected to the restriction process is used as the final current command value I*. When the primary assist control amount Ias* is in the range between the upper limit value IUL* and the lower limit value ILL*, the primary assist control amount Ias* computed by the primary assist control circuit 71 is used as the final current command value I* as it is.

The upper/lower limit guard processing circuit 73 generates a restriction state signal Sgrd that indicates whether or not the primary assist control amount Ias* has been restricted. The upper/lower limit guard processing circuit 73 outputs the primary assist control amount Ias* (the assist control amount before or after being restricted) and the restriction state signal Sgrd to the switching circuit 75.

As with the primary assist control circuit 71, the secondary assist control circuit 74 computes a secondary assist control amount Ias*sub (hereinafter referred to as a "secondary assist control amount") on the basis of the vehicle speed V, the steering torque τ, the steering angle θs, the steering torque differential value dτ, the steering speed ωs, and the steering angle acceleration αs.

The switching circuit 75 retrieves the primary assist control amount Ias* (to be exact, the assist control amount Ias* after passing through the upper/lower limit guard processing circuit 73) and the secondary assist control amount Ias*sub. The switching circuit 75 can supply one of the primary assist control amount Ias* and the secondary assist control amount Ias*sub to the motor control signal generation circuit 62 as the final current command value I*.

The switching circuit 75 includes a counter 76 for abnormality determination. The switching circuit 75 determines whether or not the primary assist control amount Ias* has been restricted on the basis of the restriction state signal Sgrd generated by the upper/lower limit guard processing circuit 73. The switching circuit 75 increases the count value of the counter 76 each time it is determined that the primary assist control amount Ias* has been restricted. The switching circuit 75 causes the assist control amount to be used to transition from the primary assist control amount Ias* to the secondary assist control amount Ias*sub on the basis of the count value of the counter 76.

Figure 3:
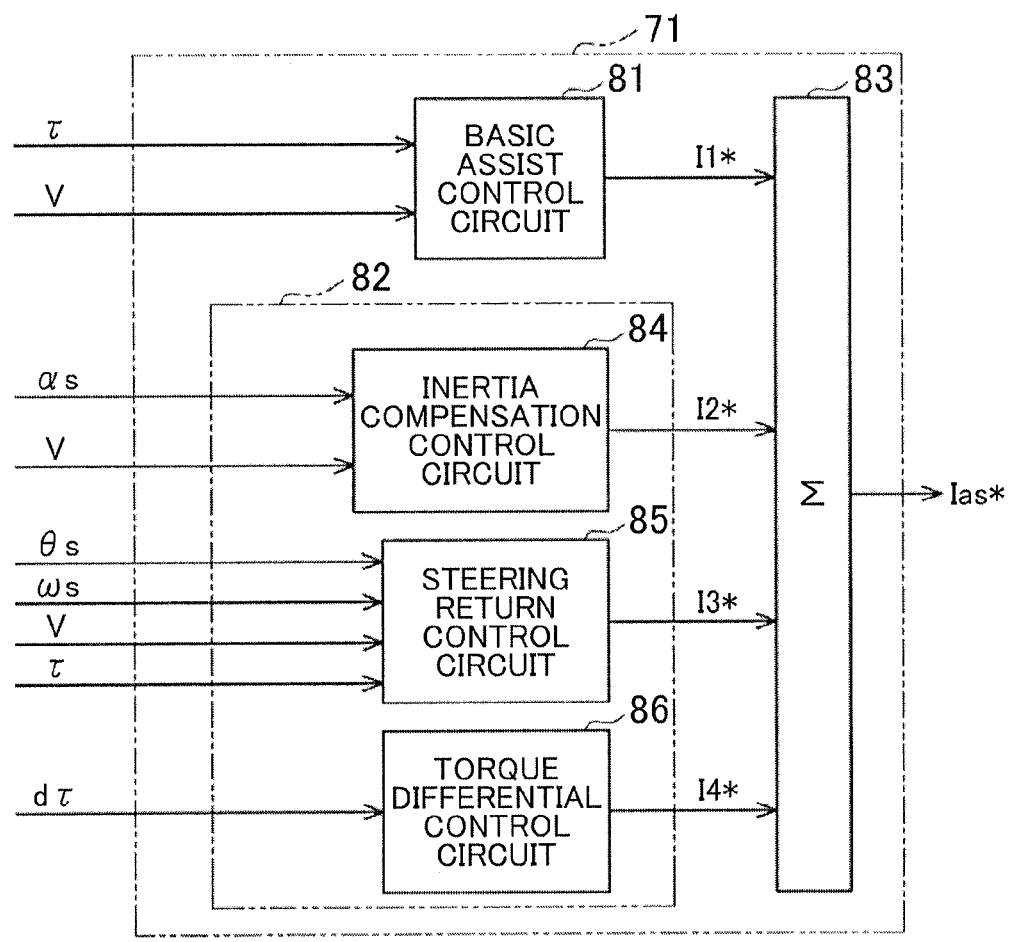
FIG. 3 is a control block diagram of an assist control circuit according to the first embodiment.

Next, the primary assist control circuit 71 will be described in detail. As illustrated in FIG. 3, the primary assist control circuit 71 includes a basic assist control circuit 81, a compensation control circuit 82, and an adder 83.

The basic assist control circuit 81 computes a basic assist control amount I1* on the basis of the steering torque τ and the vehicle speed V. The basic assist control amount I1* is a fundamental component (current value) for generating a target assist force with an appropriate magnitude that matches the steering torque τ and the vehicle speed V. The basic assist control circuit 81 computes the basic assist control amount I1* using an assist characteristic map stored in the storage device (not illustrated) of the microcomputer 42, for example. The assist characteristic map is a vehicle speed-sensitive three-dimensional map for computing the basic assist control amount I1* on the basis of the steering torque τ and the vehicle speed V, and is set so as to derive the basic assist control amount I1* with a larger value (absolute value) as the steering torque τ (absolute value) is larger and as the vehicle speed V is lower.

The compensation control circuit 82 executes various compensation control on the basic assist control amount I1* in order to achieve a better steering feel. The compensation control circuit 82 includes an inertia compensation control circuit 84, a steering return control circuit 85, and a torque differential control circuit 86.

The inertia compensation control circuit 84 computes a compensation amount I2* (current value) for compensating for the inertia of the motor 31 on the basis of the steering angle acceleration αs and the vehicle speed V. A catching feeling (tracking delay) at the start of steering with the steering wheel 21 and a flowing feel (overshoot) at the end of steering are reduced by correcting the basic assist control amount I1* using the compensation amount I2*.

The steering return control circuit 85 computes a compensation amount I3* (current value) for compensating for the return characteristics of the steering wheel 21 on the basis of the steering torque τ, the vehicle speed V, the steering angle θs, and the steering speed ωs. Excess and deficiency of self-aligning torque due to a reaction force from a road surface is compensated for by correcting the basic assist control amount I1* using the compensation amount I3*. This is because an assist force in the direction of returning the steering wheel 21 to the neutral position is generated in accordance with the compensation amount I3*.

The torque differential control circuit 86 detects a reverse input vibration component as the steering torque differential value dτ, and computes a compensation amount I4* (current value) for compensating for disturbance such as reverse input vibration on the basis of the detected steering torque differential value dτ. Disturbance such as brake vibration generated along with a brake operation is suppressed by correcting the basic assist control amount I1* using the compensation amount I4*. This is because an assist force in the direction of canceling the reverse input vibration is generated in accordance with the compensation amount I4*.

The adder 83 generates the primary assist control amount Ias* by adding the compensation amount I2*, the compensation amount I3*, and the compensation amount I4* as a process for correcting the basic assist control amount I1*.

The secondary assist control circuit 74 has a configuration similar to that of the primary assist control circuit 71. Therefore, the secondary assist control circuit 74 will not be described in detail. In the example, the secondary assist control circuit 74 has the same function as that of the primary assist control circuit 71. However, the secondary assist control circuit 74 may have a simplified function compared to the primary assist control circuit 71. In the case where the secondary assist control circuit 74 has a simplified function, the basic assist control amount I1* may be calculated on the basis of the vehicle speed V and the steering torque τ, and the basic assist control amount I1* may be used as the final current command value I* for use in simple back-up assist control. Various compensation control executed by the compensation control circuit 82 may not be executed, or only a part of the compensation control may be executed. The signal retrieved by the secondary assist control circuit 74 may be different in accordance with the compensation control to be executed.

Next, the upper/lower limit computation circuit 72 will be described in detail.

Figure 4:
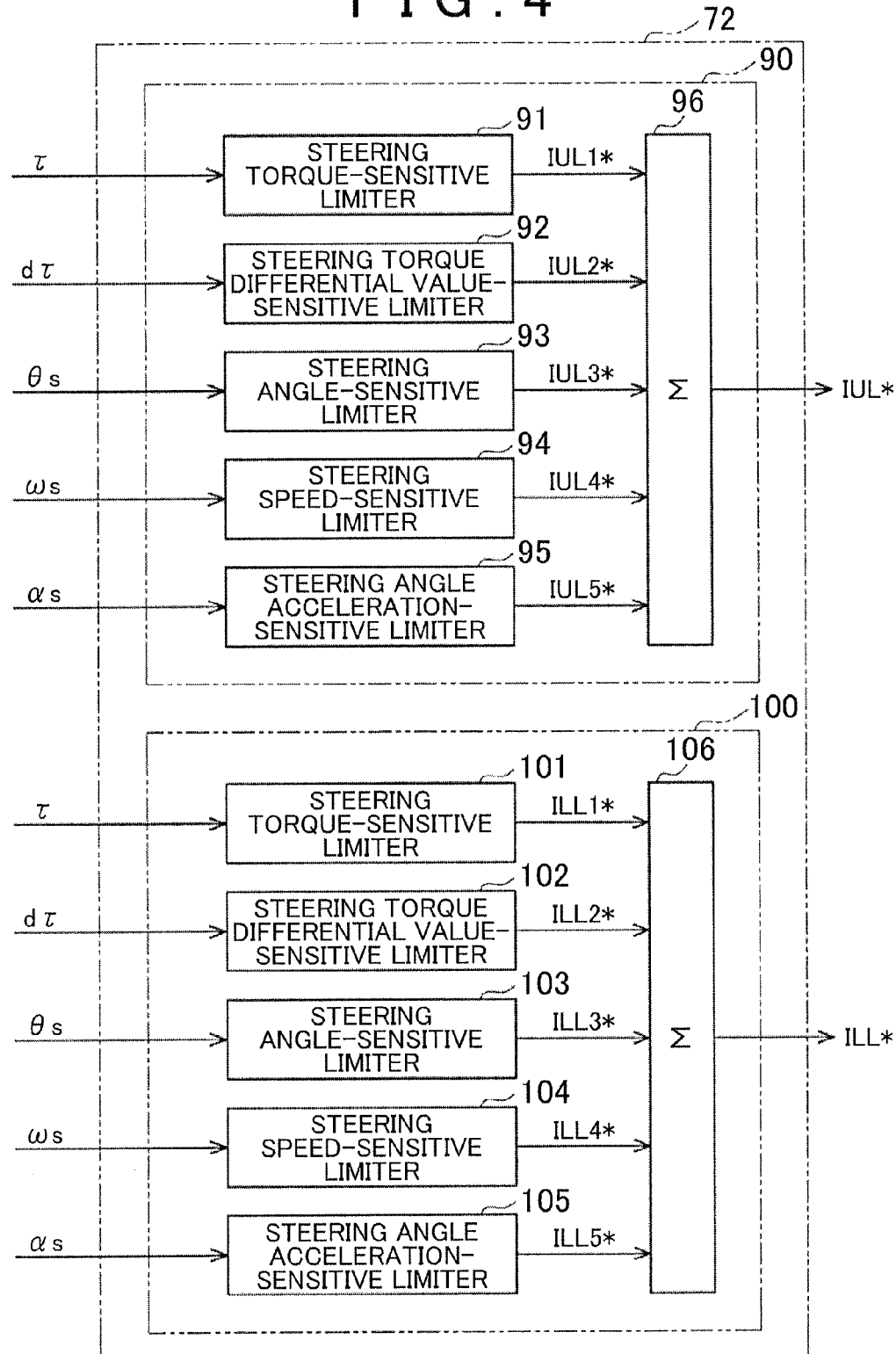
FIG. 4 is a control block diagram of an upper/lower limit computation circuit according to the first embodiment.

As illustrated in FIG. 4, the upper/lower limit computation circuit 72 includes an upper limit value computation circuit 90 and a lower limit value computation circuit 100.

The upper limit value computation circuit 90 includes a steering torque-sensitive limiter 91, a steering torque differential value-sensitive limiter 92, a steering angle-sensitive limiter 93, a steering speed-sensitive limiter 94, a steering angle acceleration-sensitive limiter 95, and an adder 96.

The steering torque-sensitive limiter 91 computes an upper limit value IUL1* for the assist control amount Ias* in accordance with the steering torque τ. The steering torque differential value-sensitive limiter 92 computes an upper limit value IUL2* for the assist control amount Ias* in accordance with the steering torque differential value dτ. The steering angle-sensitive limiter 93 computes an upper limit value IUL3* for the assist control amount Ias* in accordance with the steering angle θs. The steering speed-sensitive limiter 94 computes an upper limit value IUL4* for the assist control amount Ias* in accordance with the steering speed ωs. The steering angle acceleration-sensitive limiter 95 computes an upper limit value IUL5* for the assist control amount Ias* in accordance with the steering angle acceleration αs. The adder 96 adds the five upper limit values IUL1* to IUL5* to generate the upper limit value IUL* for the assist control amount Ias*.

The lower limit value computation circuit 100 includes a steering torque-sensitive limiter 101, a steering torque differential value-sensitive limiter 102, a steering angle-sensitive limiter 103, a steering speed-sensitive limiter 104, a steering angle acceleration-sensitive limiter 105, and an adder 106.

The steering torque-sensitive limiter 101 computes a lower limit value ILL1* for the assist control amount Ias* in accordance with the steering torque τ. The steering torque differential value-sensitive limiter 102 computes a lower limit value ILL2* for the assist control amount Ias* in accordance with the steering torque differential value dτ. The steering angle-sensitive limiter 103 computes a lower limit value ILL3* for the assist control amount Ias* in accordance with the steering angle θs. The steering speed-sensitive limiter 104 computes a lower limit value ILL4* for the assist control amount Ias* in accordance with the steering speed ωs. The steering angle acceleration-sensitive limiter 105 computes a lower limit value ILL5* for the assist control amount Ias* in accordance with the steering angle acceleration αs. The adder 106 adds the five lower limit values ILL1* to ILL5* to generate the lower limit value ILL* for the assist control amount Ias*.

The upper limit value computation circuit 90 and the lower limit value computation circuit 100 compute the upper limit values IUL1* to IUL5* and the lower limit values ILL1* to ILL5* using first to fifth limit maps M1 to M5, respectively. The first to fifth limit maps M1 to M5 are stored in the storage device (not illustrated) of the microcomputer 42. The first to fifth limit maps M1 to M5 are set on the basis of a viewpoint of permitting the assist control amount Ias* computed in accordance with a steering operation performed by the driver and not permitting an abnormal assist control amount Ias* due to some other factors.

Figure 5:
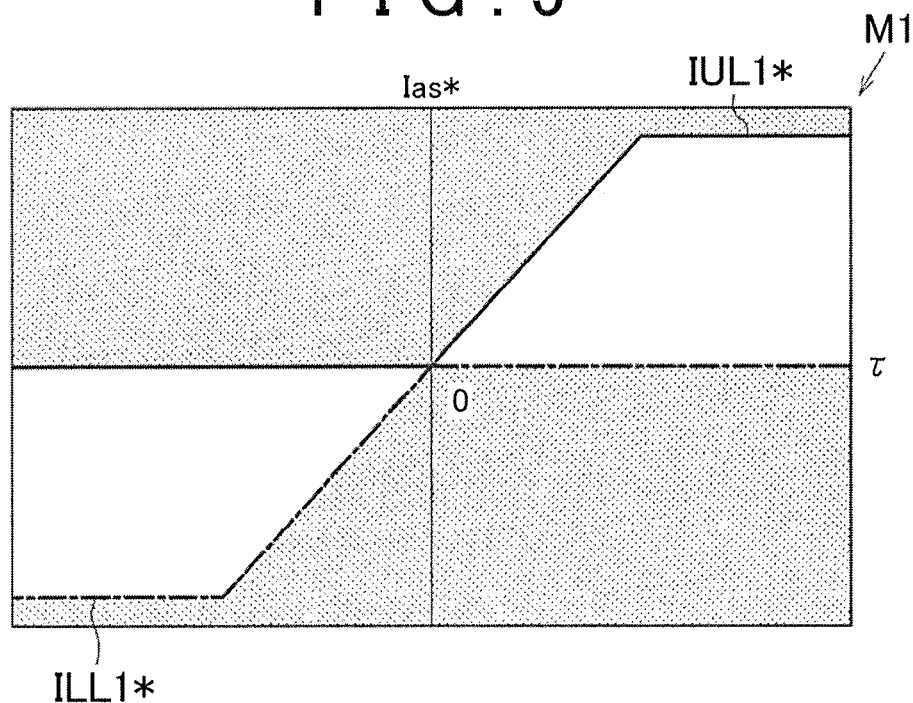
FIG. 5 is a map illustrating the relationship between steering torque and restriction values according to the first embodiment.

As illustrated in FIG. 5, the first limit map M1 is a map having a horizontal axis indicating the steering torque τ and a vertical axis indicating the assist control amount Ias*, and prescribes the relationship between the steering torque τ and the upper limit value IUL1* for the assist control amount Ias* and the relationship between the steering torque τ and the lower limit value ILL1* for the assist control amount Ias*. The steering torque-sensitive limiters 91 and 101 compute the upper limit value IUL1* and the lower limit value ILL1*, respectively, in accordance with the steering torque τ using the first limit map M1.

The first limit map M1 is set on the basis of a viewpoint of permitting the assist control amount Ias* in the same direction (positive or negative sign) as that of the steering torque τ and not permitting the assist control amount Ias* in a direction different from that of the steering torque τ, and has the following characteristics. That is, in the case where the steering torque τ has a positive value, the upper limit value IUL1* for the assist control amount Ias* is increased in the positive direction as the steering torque τ is increased, and after reaching a predetermined value, maintained at such a positive constant value. In the case where the steering torque τ has a positive value, in addition, the lower limit value ILL1* for the assist control amount Ias* is maintained at zero. In the case where the steering torque τ has a negative value, on the other hand, the upper limit value IUL1* for the assist control amount Ias* is maintained at zero. In the case where the steering torque τ has a negative value, in addition, the lower limit value ILL1* for the assist control amount Ias* is increased in the negative direction as the absolute value of the steering torque τ is increased, and after reaching a predetermined value, maintained at such a negative constant value.

Figure 6:
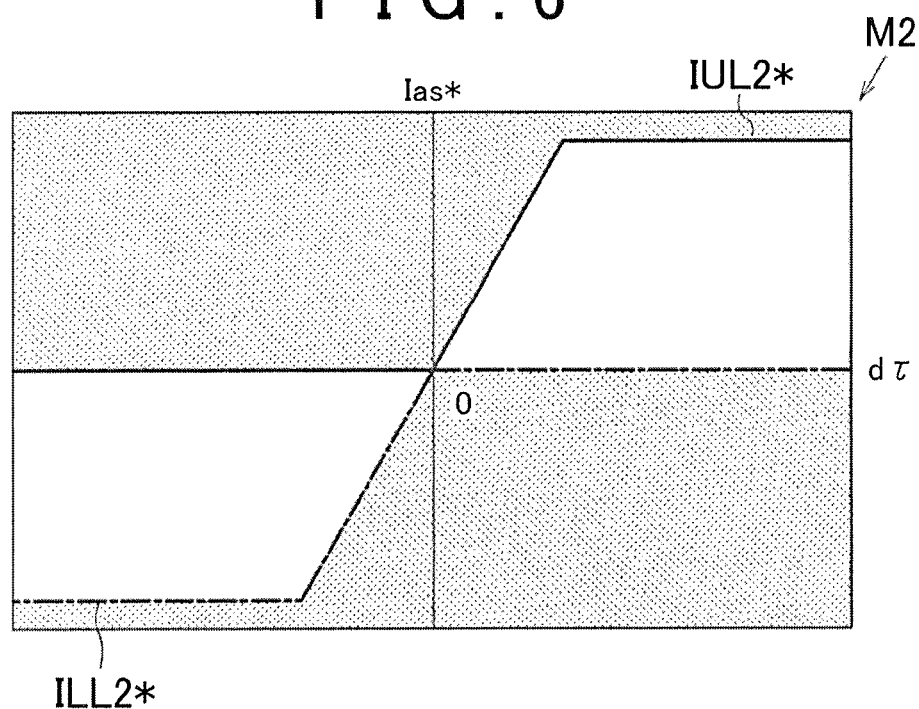
FIG. 6 is a map illustrating the relationship between a differential value of the steering torque and restriction values according to the first embodiment.

As illustrated in FIG. 6, the second limit map M2 is a map having a horizontal axis indicating the steering torque differential value dτ and a vertical axis indicating the assist control amount Ias*, and prescribes the relationship between the steering torque differential value dτ and the upper limit value IUL2* for the assist control amount Ias* and the relationship between the steering torque differential value dτ and the lower limit value ILL2* for the assist control amount Ias*. The steering torque differential value-sensitive limiters 92 and 102 compute the upper limit value IUL2* and the lower limit value ILL2*, respectively, in accordance with the steering torque differential value dτ using the second limit map M2.

The second limit map M2 is set on the basis of a viewpoint of permitting the assist control amount Ias* in the same direction (positive or negative sign) as that of the steering torque differential value dτ and not permitting the assist control amount Ias* in a direction different from that of the steering torque differential value dτ, and has the following characteristics. That is, in the case where the steering torque differential value dτ has a positive value, the upper limit value IUL2* for the assist control amount Ias* is increased in the positive direction as the steering torque differential value dτ is increased, and after reaching a predetermined value, maintained at such a positive constant value. In the case where the steering torque differential value dτ has a positive value, in addition, the lower limit value ILL2* for the assist control amount Ias* is maintained at zero. In the case where the steering torque differential value dτ has a negative value, on the other hand, the upper limit value IUL2* for the assist control amount Ias* is maintained at zero. In the case where the steering torque differential value dτ has a negative value, in addition, the lower limit value ILL2* for the assist control amount Ias* is increased in the negative direction as the absolute value of the steering torque differential value dτ is increased, and after reaching a predetermined value, maintained at such a negative constant value.

Figure 7:
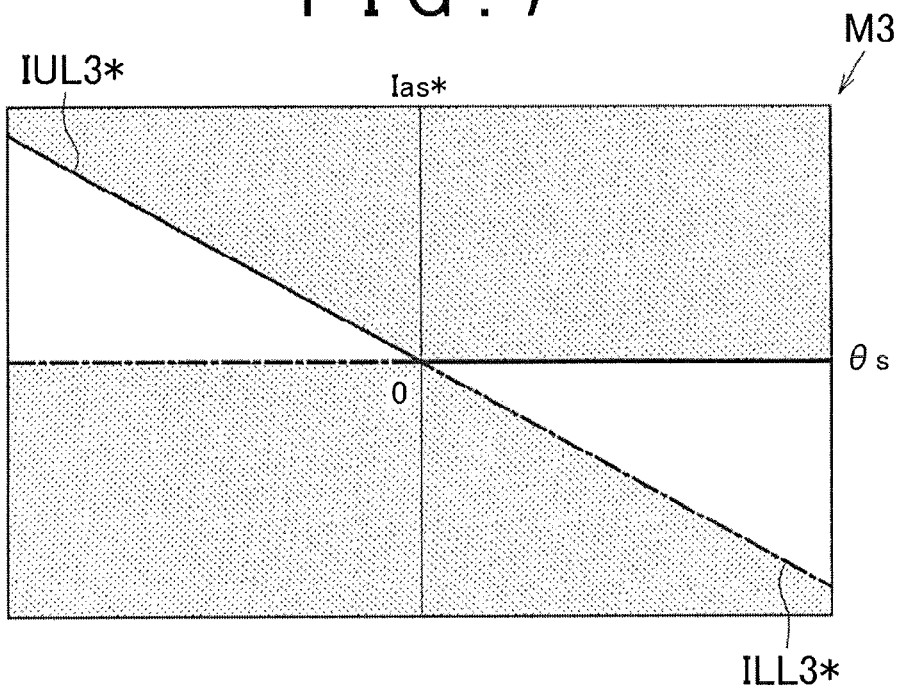
FIG. 7 is a map illustrating the relationship between a steering angle and restriction values according to the first embodiment.

As illustrated in FIG. 7, the third limit map M3 is a map having a horizontal axis indicating the steering angle θs and a vertical axis indicating the assist control amount Ias*, and prescribes the relationship between the steering angle θs and the upper limit value IUL3* for the assist control amount Ias* and the relationship between the steering angle θs and the lower limit value ILL3* for the assist control amount Ias*. The steering angle-sensitive limiters 93 and 103 compute the upper limit value IUL3* and the lower limit value ILL3*, respectively, in accordance with the steering angle θs using the third limit map M3.

The third limit map M3 is set on the basis of a viewpoint of permitting the assist control amount Ias* in the opposite direction (positive or negative sign) to that of the steering angle θs and not permitting the assist control amount Ias* in the same direction as that of the steering angle θs, and has the following characteristics. That is, in the case where the steering angle θs has a positive value, the upper limit value IUL3* for the assist control amount Ias* is maintained at zero. In the case where the steering angle θs has a positive value, in addition, the lower limit value ILL3* for the assist control amount Ias* is increased in the negative direction as the steering angle θs is increased. In the case where the steering angle θs has a negative value, on the other hand, the upper limit value IUL3* for the assist control amount Ias* is increased in the positive direction as the absolute value of the steering angle θs is increased. In the case where the steering angle θs has a negative value, in addition, the lower limit value ILL3* for the assist control amount Ias* is maintained at zero.

Figure 8:
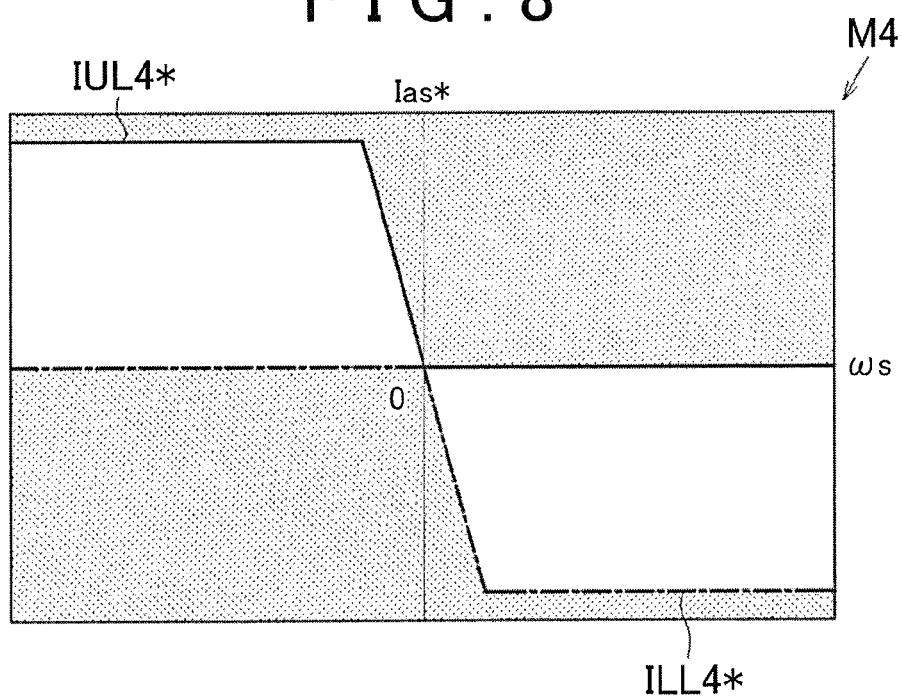
FIG. 8 is a map illustrating the relationship between a steering speed and restriction values according to the first embodiment.

As illustrated in FIG. 8, the fourth limit map M4 is a map having a horizontal axis indicating the steering speed ωs and a vertical axis indicating the assist control amount Ias*, and prescribes the relationship between the steering speed ωs and the upper limit value IUL4* for the assist control amount Ias* and the relationship between the steering speed ωs and the lower limit value ILL4* for the assist control amount Ias*. The steering speed-sensitive limiters 94 and 104 compute the upper limit value IUL4* and the lower limit value ILL4*, respectively, in accordance with the steering speed ωs using the fourth limit map M4.

The fourth limit map M4 is set on the basis of a viewpoint of permitting the assist control amount Ias* in the opposite direction (positive or negative sign) to that of the steering speed ωs and not permitting the assist control amount Ias* in the same direction as that of the steering speed ωs, and has the following characteristics. That is, in the case where the steering speed ωs has a positive value, the upper limit value IUL4* for the assist control amount Ias* is maintained at zero. In the case where the steering speed ωs has a positive value, in addition, the lower limit value ILL4* for the assist control amount Ias* is increased in the negative direction as the steering speed ωs is increased, and after reaching a predetermined value, maintained at such a negative constant value. In the case where the steering speed ωs has a negative value, on the other hand, the upper limit value IUL4* for the assist control amount Ias* is increased in the positive direction as the absolute value of the steering speed ωs is increased, and after reaching a predetermined value, maintained at such a positive constant value. In the case where the steering speed ωs has a negative value, in addition, the lower limit value ILL4* for the assist control amount Ias* is maintained at zero.

Figure 9:
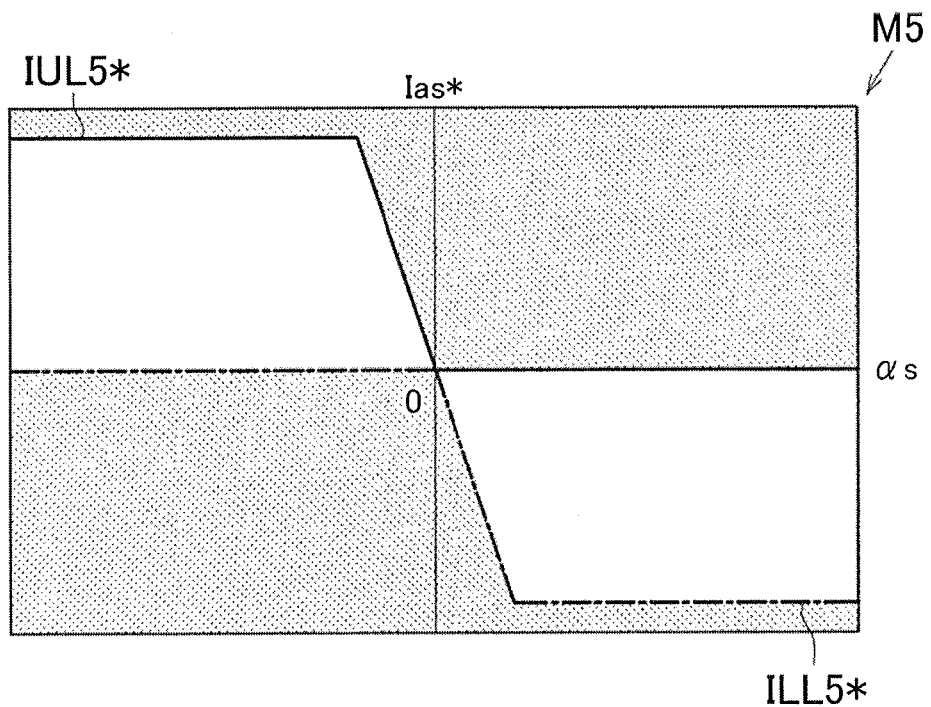
FIG. 9 is a map illustrating the relationship between a steering angle acceleration and restriction values according to the first embodiment.

As illustrated in FIG. 9, the fifth limit map M5 is a map having a horizontal axis indicating the steering angle acceleration αs and a vertical axis indicating the assist control amount Ias*, and prescribes the relationship between the steering angle acceleration αs and the upper limit value IUL5* for the assist control amount Ias* and the relationship between the steering angle acceleration αs and the lower limit value ILL5* for the assist control amount Ias*. The steering angle acceleration-sensitive limiters 95 and 105 compute the upper limit value IUL5* and the lower limit value ILL5*, respectively, in accordance with the steering angle acceleration αs using the fifth limit map M5.

The fifth limit map M5 is set on the basis of a viewpoint of permitting the assist control amount Ias* in the opposite direction (positive or negative sign) to that of the steering angle acceleration αs and not permitting the assist control amount Ias* in the same direction as that of the steering angle acceleration αs, and has the following characteristics. That is, in the case where the steering angle acceleration αs has a positive value, the upper limit value IUL5* for the assist control amount Ias* is maintained at zero. In the case where the steering angle acceleration αs has a positive value, in addition, the lower limit value ILL5* for the assist control amount Ias* is increased in the negative direction as the steering angle acceleration αs is increased, and after reaching a predetermined value, maintained at such a negative constant value. In the case where the steering angle acceleration αs has a negative value, on the other hand, the upper limit value IUL5* for the assist control amount Ias* is increased in the positive direction as the absolute value of the steering angle acceleration αs is increased, and after reaching a predetermined value, maintained at such a positive constant value. In the case where the steering angle acceleration αs has a negative value, in addition, the lower limit value ILL5* for the assist control amount Ias* is maintained at zero.

Thus, in the electric power steering system 10, restriction values (an upper limit value and a lower limit value) for the primary assist control amount Ias* are individually set for various signals used to compute the primary assist control amount Ias*, such as the steering torque τ, the steering torque differential value dτ, the steering angle θs, the steering speed ωs, and the steering angle acceleration αs which are state amounts indicating the steering state. In computing the final current command value I* on the basis of the assist control amount Ias*, the microcomputer 42 sets restriction values for restricting the variation range of the primary assist control amount Ias*, for each of the signals, in accordance with the value of each signal, and sets a value obtained by summing such restriction values as the final restriction value for the primary assist control amount Ias*.

The restriction value for the primary assist control amount Ias* set for each signal, and hence the final restriction value for the primary assist control amount Ias*, are set from a viewpoint of permitting a normal assist control amount Ias* computed in accordance with a steering operation performed by the driver, and restricting an abnormal assist control amount Ias* due to some factors. The microcomputer 42 permits the compensation amounts obtained through various compensation controls such as torque differential control and steering return control for a steering input performed by the driver, for example, but restricts an abnormal output and an erroneous output that exceed the value of each compensation amount.

When the primary assist control amount Ias* exceeds a restriction range prescribed by the final upper limit value IUL* and lower limit value ILL*, the microcomputer 42 performs restriction such that the primary assist control amount Ias* that exceeds the upper limit value IUL* or the primary assist control amount Ias* that falls below the lower limit value ILL* is not supplied to the motor control signal generation circuit 62 as the final current command value I*. The final upper limit value IUL* and lower limit value ILL* reflect individual restriction values (an upper limit value and a lower limit value) set for each signal. That is, even in the case where the primary assist control amount Ias* with an abnormal value is computed, the abnormal value of the primary assist control amount Ias* is restricted to an appropriate value that matches each signal value by the final restriction values. Then, the appropriate primary assist control amount Ias* is supplied to the motor control signal generation circuit 62 as the final current command value I* so that an appropriate assist force is applied to the steering system. Since supply of the abnormal primary assist control amount Ias* to the motor control signal generation circuit 62 as the final current command value I* is suppressed, application of an unintentional assist force to the steering system is suppressed. Occurrence of so-called self-steer, for example, is also suppressed.

In addition, appropriate restriction values for the primary assist control amount Ias* are individually set on the basis of each signal used to compute the primary assist control amount Ias*. Therefore, an elaborate restriction process is performed on the primary assist control amount Ias* compared to a case where restriction values for the primary assist control amount Ias* are set on the basis of only the steering torque τ which is a signal used to compute the basic assist control amount I1*, for example. It is not necessary to consider the effect on the compensation amounts I2*, I3*, and I4* in setting restriction values for the primary assist control amount Ias*.

Figure 10:
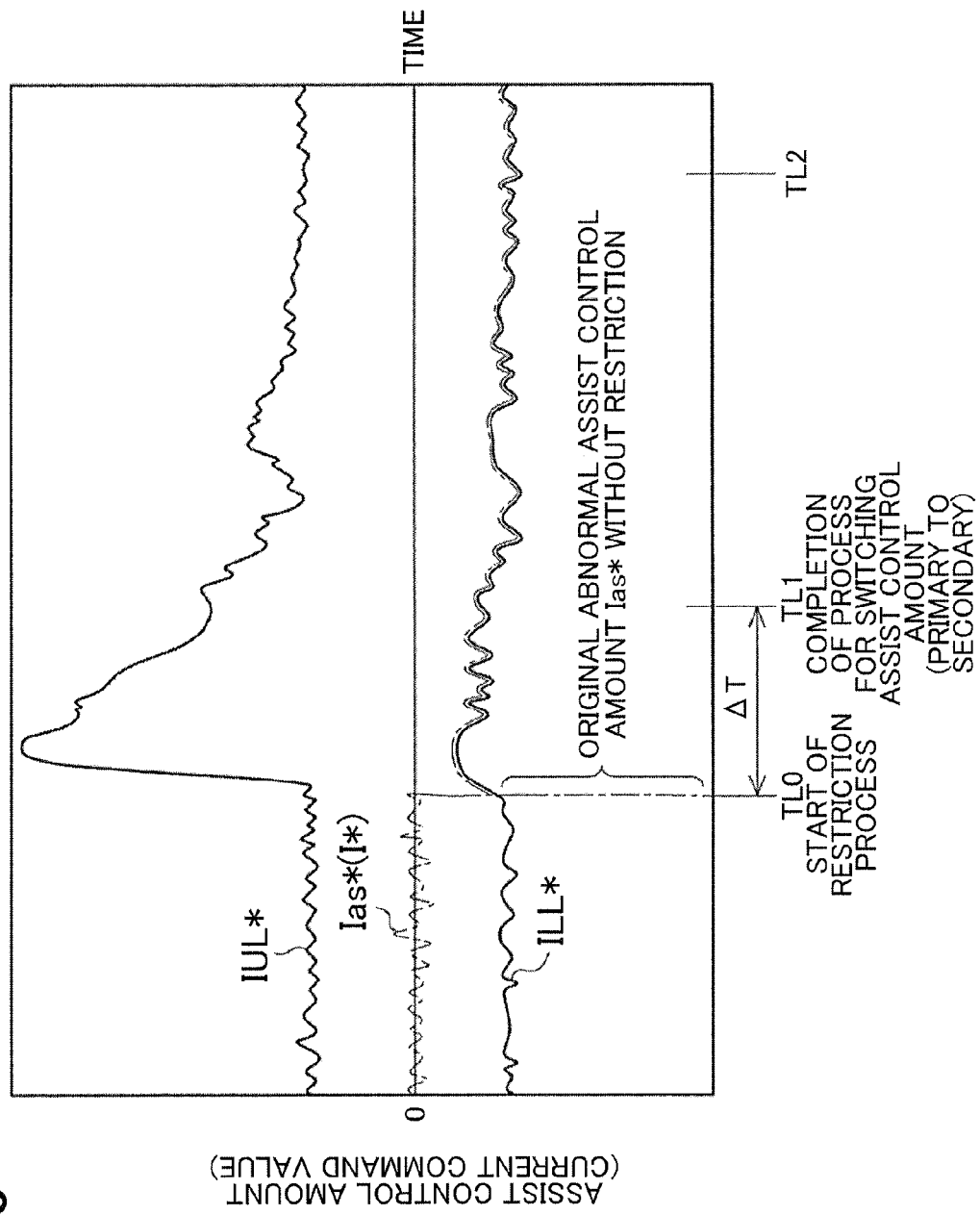
FIG. 10 is a graph illustrating variations in assist control amount (current command value) according to the first embodiment.

As illustrated in the graph of FIG. 10, when the value of the assist control amount Ias* falls below the lower limit value ILL* (time TL0), the value of the assist control amount Ias* is restricted to the lower limit value ILL* by the upper/lower limit guard processing circuit 73. The same applies to a case where the value of the assist control amount Ias* exceeds the upper limit value IUL*.

At normal times, the switching circuit 75 uses the primary assist control amount Ias*. The term "normal times" refers to a time when the restriction process is not executed by the upper/lower limit guard processing circuit 73, and a time when the time having elapsed since the start of the restriction process (time TL0) has not reached a certain period ΔT even if the restriction process is executed.

At abnormal times, the switching circuit 75 uses the secondary assist control amount Ias*sub in place of the primary assist control amount Ias*. The term "abnormal times" refers to a time (time TL1) when the restriction process for the primary assist control amount Ias* has been performed continuously for the certain period ΔT as illustrated in the graph of FIG. 10. A suitable assist force is continuously applied to the steering system by using a normal assist control amount Ias* obtained by the secondary assist control circuit 74.

The detailed procedure of the restriction process performed by the upper/lower limit guard processing circuit 73 is as follows.

Figure 11:
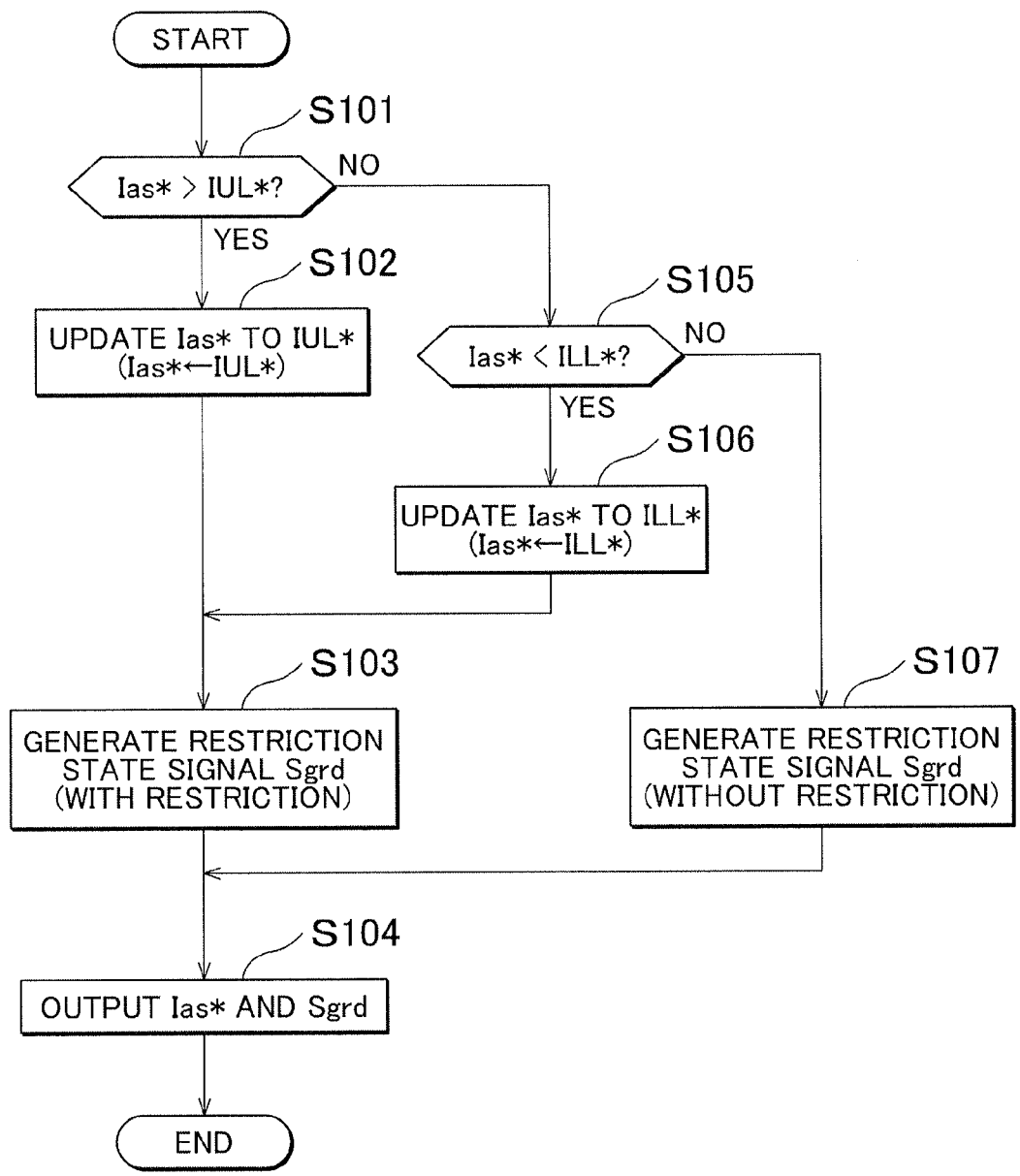
FIG. 11 is a flowchart illustrating the process procedure for an upper/lower limit guard processing circuit according to the first embodiment.

As illustrated in the flowchart of FIG. 11, the upper/lower limit guard processing circuit 73 judges whether or not the primary assist control amount Ias* is larger than the upper limit value IUL* (step S101). When it is judged that the primary assist control amount Ias* is larger than the upper limit value IUL* (YES in step S101), the upper/lower limit guard processing circuit 73 updates (restricts) the primary assist control amount Ias* to the upper limit value IUL* (step S102).

Next, the upper/lower limit guard processing circuit 73 generates a restriction state signal Sgrd (step S103). The restriction state signal Sgrd generated here is a signal indicating that the primary assist control amount Ias* has been restricted.

Next, the upper/lower limit guard processing circuit 73 outputs the primary assist control amount Ias* which has been updated (restricted) to the upper limit value IUL* in step S102 described earlier and the restriction state signal Sgrd generated in step S103 described earlier to the switching circuit 75 (step S104), and the process is ended.

When it is judged in the judgment made in step S101 described earlier that the primary assist control amount Ias* is not larger than the upper limit value IUL* (NO in step S101), the upper/lower limit guard processing circuit 73 judges whether or not the primary assist control amount Ias* is smaller than the lower limit value ILL* (step S105).

When it is judged that the primary assist control amount Ias* is smaller than the lower limit value ILL* (YES in step S105), the upper/lower limit guard processing circuit 73 updates (restricts) the primary assist control amount Ias* to the lower limit value ILL* (step S106), and the process proceeds to step S103.

When it is judged in the judgment made in step S105 described earlier that the primary assist control amount Ias* is not lower than the lower limit value ILL* (NO in step S105), the upper/lower limit guard processing circuit 73 generates a restriction state signal Sgrd (step S107), and the process proceeds to step S104. The restriction state signal Sgrd generated here is a signal indicating that the primary assist control amount Ias* has not been restricted.

Figure 12:
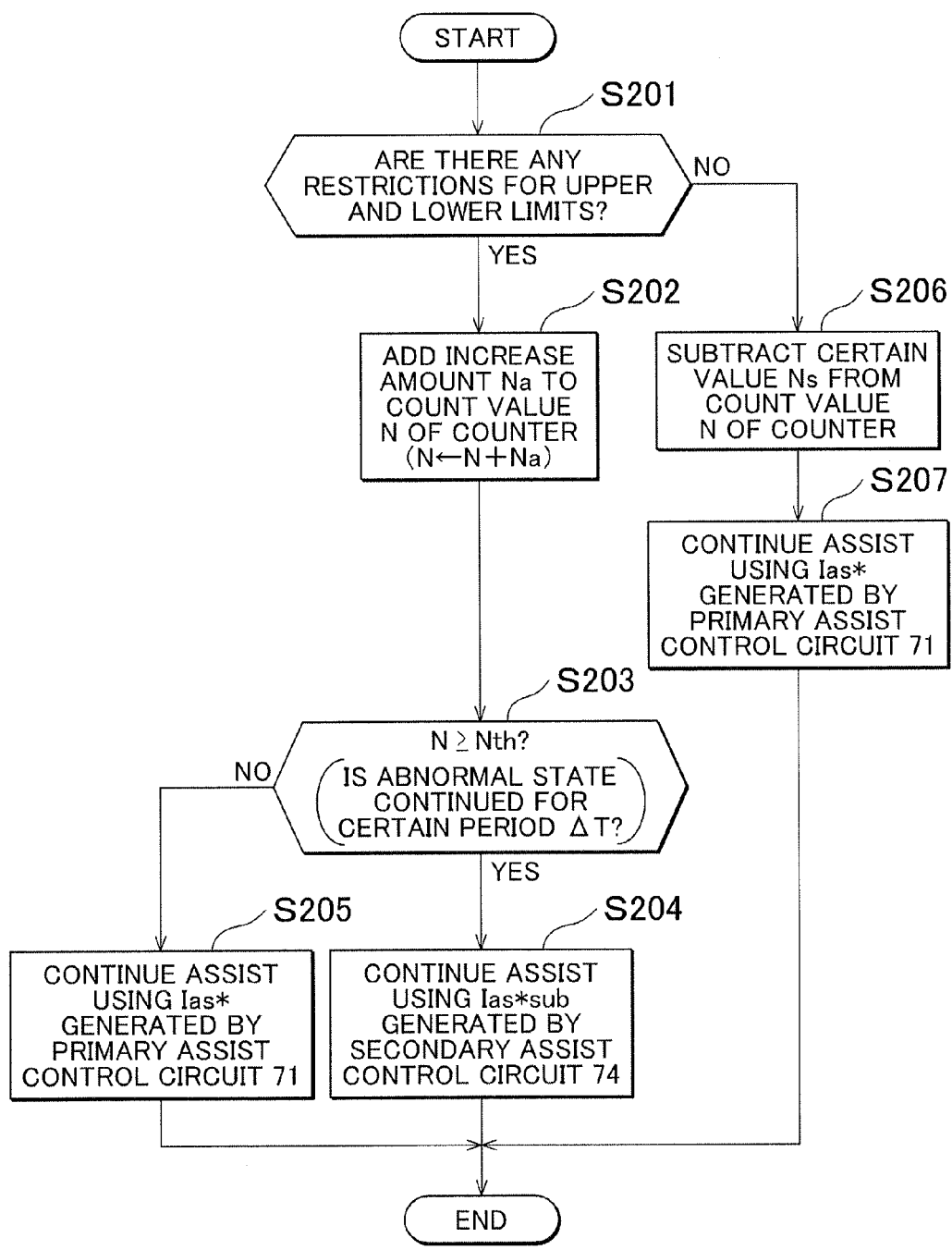
FIG. 12 is a flowchart illustrating the process procedure for a switching circuit according to the first embodiment.

Next, an example of the procedure of a switching process performed by the switching circuit 75 will be described. As illustrated in the flowchart of FIG. 12, the switching circuit 75 judges whether or not the primary assist control amount Ias* has been restricted on the basis of the restriction state signal Sgrd generated by the upper/lower limit guard processing circuit 73 (step S201).

When it is judged that the primary assist control amount Ias* has been restricted (YES in step S201), the switching circuit 75 adds a prescribed increase amount (count amount) Na to the count value N of the counter 76 (step S202).

Next, the switching circuit 75 judges whether or not the count value N is equal to or more than an abnormality determination threshold Nth (step S203). The judgment corresponds to a judgment as to whether or not the primary assist control amount Ias* has been continuously restricted for the certain period ΔT as illustrated in the graph of FIG. 10 described earlier.

When it is judged that the count value N is equal to or more than the abnormality determination threshold Nth (YES in step S203), the switching circuit 75 continues steering assist using the secondary assist control amount Ias*sub (step S204), and the process is ended. That is, the switching circuit 75 supplies the secondary assist control amount Ias*sub to the motor control signal generation circuit 62 as the final current command value I* in place of the primary assist control amount Ias*.

When it is judged in the judgment made in step S203 described earlier that the count value N is not equal to or more than the abnormality determination threshold Nth (NO in step S203), the switching circuit 75 continues steering assist using the primary assist control amount Ias* (to be exact, the assist control amount Ias* after passing through the upper/lower limit guard processing circuit 73) (step S205), and the process is ended.

When it is judged in the judgment made in step S201 described earlier that the primary assist control amount Ias* has not been restricted (NO in step S201), the switching circuit 75 subtracts a certain value Ns from the count value N of the counter 76 (step S206). The certain value Ns to be subtracted from the count value N is set to a value that is smaller than the increase amount Na to be added to the count value N. Next, the switching circuit 75 continues steering assist using the primary assist control amount Ias* (to be exact, the assist control amount Ias* after passing through the upper/lower limit guard processing circuit 73) (step S207), and the process is ended.

The processes in steps S206 and S207 may be omitted in the flowchart of FIG. 12. In this case, the process is ended when the switching circuit 75 judges that the primary assist control amount Ias* has not been restricted (NO in step S201).

In this way, when an abnormal state in which the primary assist control amount Ias* is restricted is continued for a certain time or more, the assist control amount to be used is switched from the primary assist control amount Ias* to the secondary assist control amount Ias*sub as prescribed failsafe operation. Therefore, higher safety can be obtained. In addition, while the count value N is increased by the increase amount Na when the primary assist control amount Ias* is restricted, the count value N is decreased by the certain value Ns (<Na) when the assist control amount Ias* is not restricted. Therefore, the switching process is performed in consideration of whether or not the assist control amount Ias* is restricted at the time.

When the assist control amount Ias* to be used is switched from the primary assist control amount Ias* to the secondary assist control amount Ias*sub, the following concern may arise. For example, a steering feel may be degraded compared to normal times during a period (abnormality determination period) since the primary assist control amount Ias* is restricted until the count value N reaches a value that is equal to or more than the abnormality determination threshold Nth. This is because of the use of the primary assist control amount Ias* which has been restricted to the upper limit value IUL* or the lower limit value ILL* rather than the original appropriate assist control amount Ias*.

The following three states indicated by (A1) to (A3) are assumed as examples of the state of the restricted primary assist control amount Ias*.

(A1) When the sign (+/−) of the restricted primary assist control amount Ias* is reversed alternately. At this time, the value of the primary assist control amount Ias* is alternately switched between the upper limit value IUL* and the lower limit value ILL*. The direction of torque of the motor 31 is alternately reversed, which incurs a concern about occurrence of vibration.

(A2) When the sign of the restricted primary assist control amount Ias* is opposite to the sign of the steering torque τ. At this time, there is a concern about occurrence of so-called reverse assist, in which the direction of torque of the motor 31 is opposite to the original direction of torque.

(A3) When the sign of the restricted primary assist control amount Ias* is the same as the sign of the steering torque τ. At this time, there is a concern about occurrence of so-called self-steer (forward direction), depending on the degree of deviation between the restricted assist control amount Ias* and the original normal assist control amount Ias*.

In a situation in which the value of the steering torque τ is large such as during a U-turn, for example, the restriction width (guard width) which is defined by the upper limit value IUL* and the lower limit value ILL* is widened in accordance with an increase in value of the steering torque τ. In any of the state A1, the state A2, and the state A3, as the steering torque τ, and hence the restriction width for the primary assist control amount Ias*, becomes larger, the effect on fluctuations in torque of the motor 31 becomes larger. Thus, in the case where large steering torque τ is generated, it is preferable to immediately switch to the secondary assist control amount Ias*sub.

In contrast, when steering is performed slowly in the range of fine correction such as corrective steering for finely adjusting the steering angle of the steering wheel during cornering, for example, the value of the steering torque τ does not become so large. Therefore, the restriction width for the primary assist control amount Ias* which is defined by the upper limit value IUL* and the lower limit value ILL* does not become so wide. Thus, in this event, the value of the restricted primary assist control amount Ias* is closer to the normal assist control amount Ias* before being restricted. Therefore, the effect of the restricted primary assist control amount Ias* on torque of the motor 31 is small. Thus, it is not necessary to immediately switch to the secondary assist control amount Ias*sub compared to a case where large steering torque τ is generated.

In the light of the above, the example adopts the following configuration in order to suppress the effect of fluctuations in torque of the motor 31 on the steering feel when switching is performed from the primary assist control amount Ias* to the secondary assist control amount Ias*sub.

Figure 13:
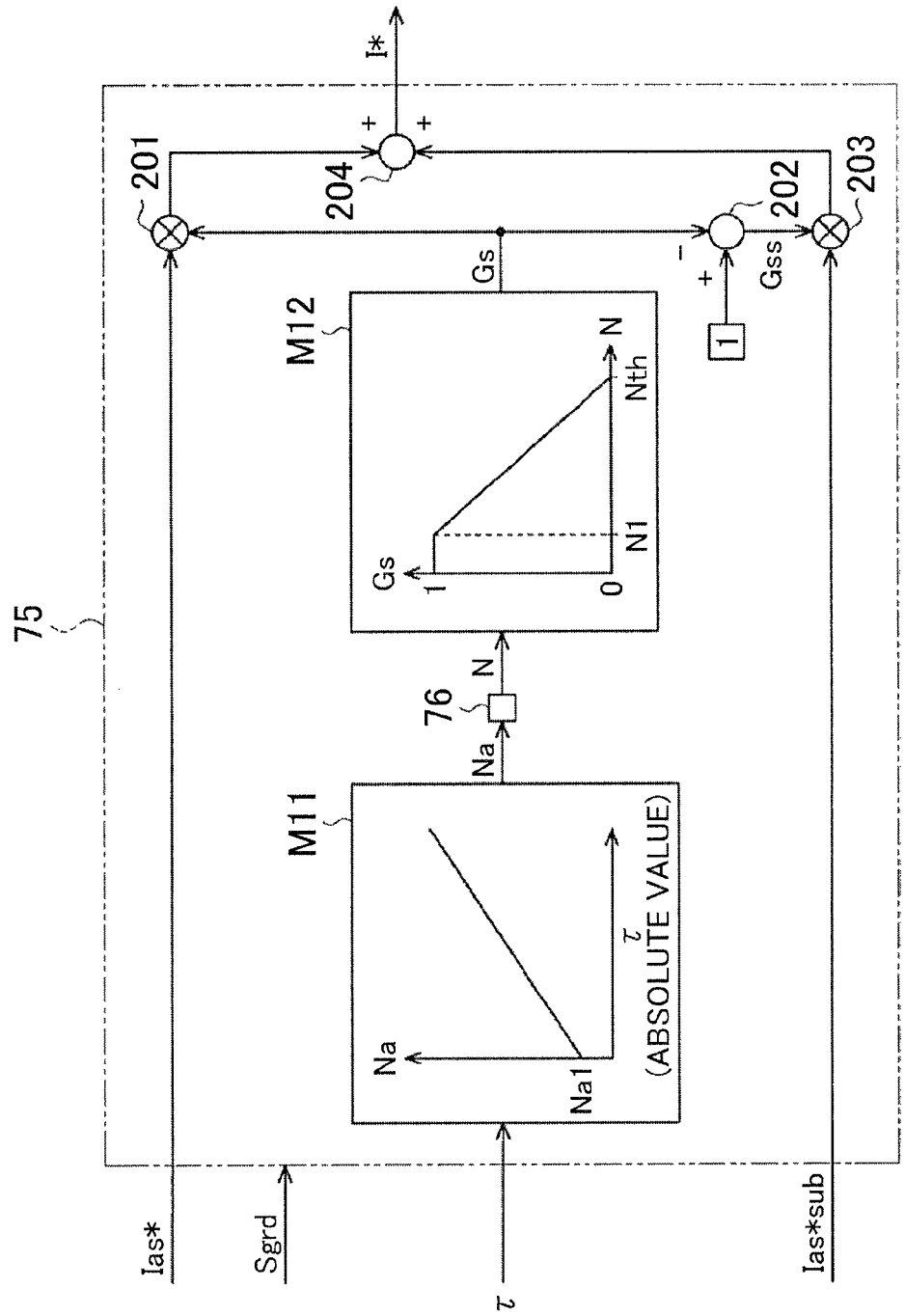
FIG. 13 is a control block diagram of the switching circuit according to the first embodiment.

As illustrated in FIG. 13, the switching circuit 75 includes, in addition to the counter 76, an increase amount setting map M11, a gain setting map M12, a first multiplier 201, a first adder 202, a second multiplier 203, and a second adder 204.

The increase amount setting map M11 is a map having a horizontal axis indicating the steering torque τ (absolute value) and a vertical axis indicating the increase amount Na of the counter 76. The increase amount setting map M11 retrieves the steering torque τ to calculate the increase amount Na in accordance with the absolute value of the steering torque τ. The increase amount setting map M11 is set on the basis of a viewpoint of appropriately switching from the primary assist control amount Ias* to the secondary assist control amount Ias*sub in accordance with the absolute value of the steering torque τ. The increase amount setting map M11 has the following characteristics. That is, as the absolute value of the steering torque τ becomes larger, the calculated value of the increase amount Na becomes larger from a basic increase amount Na1 which is the increase amount Na at the time when the steering torque τ is zero.

The counter 76 retrieves the increase amount Na calculated using the increase amount setting map M11, and increases the count value N using the retrieved increase amount Na. The gain setting map M12 is a map having a horizontal axis indicating the count value N of the counter 76 and a vertical axis indicating a distribution gain Gs for the primary assist control amount Ias* and the secondary assist control amount Ias*sub. The distribution gain Gs is used to change the proportions of the primary assist control amount Ias* and the secondary assist control amount Ias*sub in the final current command value I*. The gain setting map M12 retrieves the count value N of the counter 76, and calculates the distribution gain Gs in accordance with the retrieved count value N. The distribution gain Gs is set to a value of zero or more and one or less. The gain setting map M12 has the following characteristics. That is, while the count value N is increased from zero to a predetermined threshold N1, the value of the distribution gain Gs is maintained at one. During a period since the count value N exceeds the predetermined threshold N1 until the count value N reaches the abnormality determination threshold Nth (>N1), the value of the distribution gain Gs is decreased as the count value N is increased. After the count value N reaches the abnormality determination threshold Nth, the value of the distribution gain Gs is maintained at zero.

The first multiplier 201 multiplies the primary assist control amount Ias* (assist control amount before or after being restricted) acquired through the upper/lower limit guard processing circuit 73 by the distribution gain Gs calculated using the gain setting map M12.

The first adder 202 subtracts the distribution gain Gs calculated in accordance with the gain setting map M12 from its maximum value 1 to calculate a difference gain Gss. The second multiplier 203 multiplies the secondary assist control amount Ias*sub calculated by the secondary assist control circuit 74 by the difference gain Gss calculated by the first adder 202.

The second adder 204 adds the primary assist control amount Ias* multiplied by the distribution gain Gs calculated by the first multiplier 201 to the secondary assist control amount Ias*sub multiplied by the difference gain Gss calculated by the second multiplier 203 to generate the final current command value I*.

With the configuration, as the absolute value of the steering torque τ is larger, the increase amount Na of the counter 76 is set to a larger value. Therefore, as the absolute value of the steering torque τ is larger, the count value N of the counter 76 is increased faster. Switching is made from the primary assist control amount Ias* which is restricted to a restriction value to the secondary assist control amount Ias*sub faster by an amount corresponding to the increase in count value N. That is, as the absolute value of the steering torque τ is larger, a period (FIG. 10: certain period ΔT) since restriction on the primary assist control amount Ias* is started until switching to the secondary assist control amount Ias*sub is reduced to be shorter. Thus, it is possible to reduce a period in which fluctuations in torque of the motor 31 affect the behavior of steering performed by the driver, e.g. a period of occurrence of self-steer or reverse assist.

In addition, the proportions of the primary assist control amount Ias* and the secondary assist control amount Ias*sub in the final current command value I* are varied in accordance with the steering torque τ. For example, such proportions may be varied as described in the following (B1) to (B3).

(B1) When the value of the distribution gain Gs is 1.0, the proportions of the primary assist control amount Ias* and the secondary assist control amount Ias*sub in the final current command value I* are 100:0. At this time, the restricted primary assist control amount Ias* is used as the final current command value I* as it is.

(B2) When the value of the distribution gain Gs is 0.5, the proportions of the primary assist control amount Ias* and the secondary assist control amount Ias*sub in the final current command value I* are 50:50.

(B3) When the value of the distribution gain Gs is zero, the proportions of the primary assist control amount Ias* and the secondary assist control amount Ias*sub in the final current command value I* are 0:100. At this time, the secondary assist control amount Ias*sub is used as the final current command value I* as it is.

In this way, abrupt switching from the restricted primary assist control amount Ias* to the secondary assist control amount Ias*sub is suppressed by varying the proportion of the secondary assist control amount Ias*sub in the final current command value I* in accordance with the steering torque τ, and hence the count value N. Therefore, fluctuations in torque of the motor 31 due to deviation between the restricted primary assist control amount Ias* and the secondary assist control amount Ias*sub are suppressed. It is possible to continue more appropriate steering assist in accordance with the steering torque τ.

According to the first embodiment, the following effects can be obtained.

(1) The restriction values for the assist control amount Ias* are individually set for each signal (each state amount) used to compute the assist control amount Ias*, and a value obtained by summing such restriction values is set as the final restriction value for the assist control amount Ias*. Therefore, even in the case where the assist control amount Ias* with an abnormal value is computed because of some factors, the abnormal assist control amount Ias* is restricted to an appropriate value that matches each signal value directly by the final restriction value. It is possible to adequately suppress application of an unintentional assist force to the steering system with the assist control amount Ias* which has been restricted to an appropriate value supplied to the motor control signal generation circuit 62 as the final current command value I*.

(2) When an abnormal state in which the primary assist control amount Ias* is restricted is continued for a certain time or more, the assist control amount Ias* to be used is switched from the primary assist control amount Ias* to the secondary assist control amount Ias*sub as prescribed fail-safe operation. Therefore, higher safety can be obtained.

(3) As the absolute value of the steering torque τ is larger, the increase amount Na of the counter 76 is increased. Therefore, as the absolute value of the steering torque τ is larger, the count value N reaches the abnormality determination threshold Nth faster. That is, the prescribed fail-safe operation (operation of switching the assist control amount Ias* to be used) is completed faster. Thus, the effect on fluctuations in torque of the motor 31, and hence the behavior of steering performed by the driver, can be reduced by an amount corresponding to the reduction in abnormality determination period (period since the process for restricting the assist control amount is started until N≥Nth is met).

(4) As the count value N is increased, the proportion of the secondary assist control amount Ias*sub in the final current command value I* is increased. That is, as the count value N becomes larger, the effect of the restricted primary assist control amount Ias* on the motor torque becomes smaller, and the effect of the secondary assist control amount Ias*sub on the motor torque becomes larger. Therefore, fluctuations in torque of the motor 31 during the abnormality determination period are suitably suppressed. In addition, the width of torque fluctuations caused when switching is made from the primary assist control amount Ias* to the secondary assist control amount Ias*sub is narrowed.

Next, an electric power steering system according to a second embodiment will be described. The present embodiment is different from the first embodiment in that the speed of transition from the primary assist control amount Ias* to the secondary assist control amount Ias*sub is changed in consideration of not only the steering torque τ but also the state of the restricted primary assist control amount Ias*.

As illustrated in FIG. 14, the current command value computation circuit 61 includes a transition level determination circuit 77. The transition level determination circuit 77 retrieves the primary assist control amount Ias* (before or after being restricted), the restriction state signal Sgrd, the upper limit value IUL*, the lower limit value ILL*, and the steering torque τ, and determines a transition level on the basis of such retrieved signals. The term "transition level" refers to the degree to which torque of the motor 31, and hence the steering behavior, is affected by the primary assist control amount Ias* (before or after being restricted). In the case where the assist control amount Ias* which is abnormal is output, the speed of transition from the primary assist control amount Ias* to the secondary assist control amount Ias*sub is preferably higher as the degree to which torque of the motor 31 is affected by the primary assist control amount Ias* is higher.

The transition level determination circuit 77 determines whether or not the primary assist control amount Ias* has been restricted on the basis of the restriction state signal Sgrd. When it is determined that the primary assist control amount Ias* has been restricted, the transition level determination circuit 77 determines the status of the primary assist control amount Ias* on the basis of the primary assist control amount Ias*, the upper limit value IUL*, and the lower limit value ILL*. Examples of the determined status include the states A1 to A3 discussed earlier. The transition level determination circuit 77 determines the transition level on the basis of the state of the primary assist control amount Ias* while taking the steering torque τ into consideration. The transition level determination circuit 77 generates a transition level gain GL with a value that matches the determined transition level.

When one of the states A1, A2, and A3 discussed earlier is detected as the status of the primary assist control amount Ias*, the transition level determination circuit 77 determines the transition level as follows.

(C1) When the state A1 which incurs a concern about large vibration is detected. At this time, the transition level determination circuit 77 determines a transition level L1.

(C2) When the state A2 which incurs a concern about reverse assist is detected. At this time, the transition level determination circuit 77 determines a transition level L2.

(C3) When the state A3 which incurs a concern about self-steer is detected. At this time, the transition level determination circuit 77 determines a transition level L3.

The magnitude relationship of the degree to which the motor torque, and hence the steering feel, is affected at the transition levels L1 to L3 is as indicated by the following formula (1):

$$L1 > L2 > L3 \quad (1)$$

As illustrated in FIG. 15, the switching circuit 75 includes a multiplier 205. The multiplier 205 is provided in a computation path between the increase amount setting map M11 and the counter 76. The multiplier 205 retrieves the transition level gain GL generated by the transition level determination circuit 77, and multiplies the retrieved transition level gain GL by the increase amount Na calculated using the increase amount setting map M11. The counter 76 increases the count value N using the increase amount Na multiplied by the transition level gain GL.

Figure 16A:
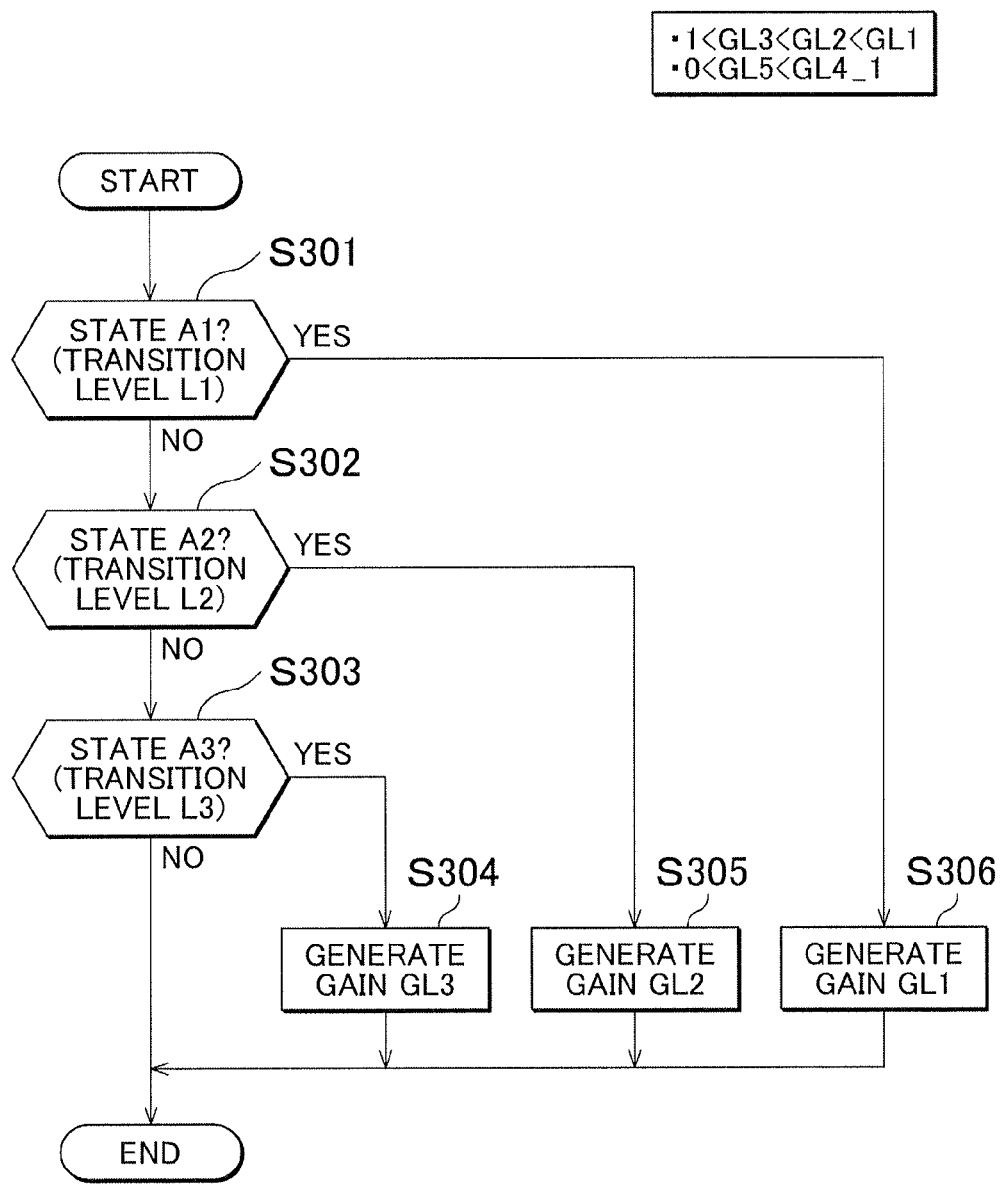
FIG. 16A is a flowchart illustrating the process procedure for a transition level determination circuit according to the second embodiment.

Next, the procedure of a transition level determination process performed by the transition level determination circuit 77 will be described. As illustrated in the flowchart of FIG. 16A, the transition level determination circuit 77 judges whether or not the state of the primary assist control amount Ias* is the state A1 (step S301). When the transition level determination circuit 77 judges that the state of the primary assist control amount Ias* is not the state A1 (NO in step S301), the process proceeds to step S302.

In step S302, the transition level determination circuit 77 judges whether or not the state of the primary assist control amount Ias* is the state A2. When the transition level determination circuit 77 judges that the state of the primary assist control amount Ias* is not the state A2 (NO in step S302), the process proceeds to step S303.

In step S303, the transition level determination circuit 77 judges whether or not the state of the primary assist control amount Ias* is the state A3. When the transition level determination circuit 77 judges that the state of the primary assist control amount Ias* is not the state A3 (NO in step S303), the process is ended.

When it is judged in step S303 that the state of the primary assist control amount Ias* is the state A3 (YES in step S303), in contrast, the transition level determination circuit 77 generates a gain GL3 as the transition level gain GL (step S304), and the process is ended.

When it is judged in step S302 described earlier that the state of the primary assist control amount Ias* is the state A2 (YES in step S302), meanwhile, the transition level determination circuit 77 generates a gain GL2 as the transition level gain GL (step S305), and the process is ended.

When it is judged in step S301 described earlier that the state of the primary assist control amount Ias* is the state A1 (YES in step S301), meanwhile, the transition level determination circuit 77 generates a gain GL1 as the transition level gain GL (step S306), and the process is ended.

The magnitude relationship among the three gains GL1, GL2, and GL3 is as indicated by the following formula (2), and all the gains GL1, GL2, and GL3 are larger than one.

$$1 < GL3 < GL2 < GL1 \quad (2)$$

Therefore, when one of the states A1, A2, and A3 occurs, the value of the increase amount Na retrieved by the counter 76 is larger than the value of the increase amount Na calculated using the increase amount setting map M11. Thus, the count value N is increased by an incremental value that is larger than that at normal times (in none of the states A1 to A3), and thus the value of the distribution gain Gs calculated using the gain setting map M12 is reduced more immediately than at normal times. That is, the proportion of the primary assist control amount Ias* in the final current command value I* is reduced more immediately than at normal times, and the proportion of the secondary assist control amount Ias*sub is increased more immediately than at normal times. The effect on fluctuations in torque of the motor 31 is also reduced by an amount corresponding to the immediate reduction in proportion of the primary assist control amount Ias* in the final current command value I*.

In addition, as indicated by the formula (2) described earlier, as the effect on fluctuations in torque of the motor 31 is larger, the transition level gain GL (GL1, GL2, GL3) with a larger value is derived. Therefore, the proportion of the primary assist control amount Ias* in the final current command value I* is reduced further more immediately.

Further, even in the same state A1 to A3, the degree to which fluctuations in torque of the motor 31 are affected differs depending on the magnitude (absolute value) of the steering torque τ. That is, as the value of the steering torque τ is larger, the degree to which fluctuations in torque of the motor 31 are affected is larger. In the example, in view of this respect, as the absolute value of the steering torque τ is larger, the value of the increase amount Na for the counter 76 is set to be larger, and hence the value of the distribution gain Gs is set to be smaller more immediately. Therefore, the proportion of the primary assist control amount Ias* in the final current command value I* is reduced further more immediately.

Then, after the count value N reaches the abnormality determination threshold Nth, the distribution gain Gs is maintained at zero. Therefore, the proportion of the primary assist control amount Ias* in the final current command value I* is 0%, and the proportion of the secondary assist control amount Ias*sub is 100%. That is, the assist control amount Ias* to be used is completely switched from the primary assist control amount Ias* to the secondary assist control amount Ias*sub. As the absolute value of the steering torque τ is larger, and as the effect on fluctuations in motor torque is larger, the value of the increase amount Na for the counter 76 is set to a larger value, and thus the speed of transition from the primary assist control amount Ias* to the secondary assist control amount Ias*sub is higher.

In some situations, the speed of transition from the primary assist control amount Ias* to the secondary assist control amount Ias*sub may be reduced, rather than be increased. Examples of such situations include the following two states (A4) and (A5).

(A4) When the sign (+/−) of the primary assist control amount Ias* which has been restricted is the same as the sign of the steering torque τ and the absolute value of the primary assist control amount Ias* which has been restricted is small. That is, when the assist force may be excessively large, although not so large as to cause so-called self-steer (forward direction).

(A5) When the sign (+/−) of the primary assist control amount Ias* which has been restricted is the same as or opposite to the sign of the steering torque τ and the absolute value of the primary assist control amount Ias* which has been restricted is so small as to approximate zero. That is, when the assist force may be excessively small.

When the state A4 or the state A5 is detected as the state of the primary assist control amount Ias*, the transition level determination circuit 77 determines the transition level as follows.

(C4) When the state A4 which incurs a concern about so-called excessively large assist is detected. At this time, the transition level determination circuit 77 determines a transition level L4.

(C5) When the state A5 which incurs a concern about so-called excessively small assist is detected. At this time, the transition level determination circuit 77 determines a transition level L5.

The magnitude relationship of the degree to which the motor torque, and hence the steering feel, is affected at the transition levels L1 to L5 is as indicated by the following formula (3):

$$L1 > L2 > L3 > L4 > L5 \quad (3)$$

In the case where the state A4 or the state A5 occurs, the effect on fluctuations in torque of the motor 31, and hence the steering feel, is considered to be extremely small compared to a case where one of the states A1 to A3 described earlier occurs. Therefore, the procedure of the transition level determination process performed by the transition level determination circuit 77 may be as follows.

Figure 16B:
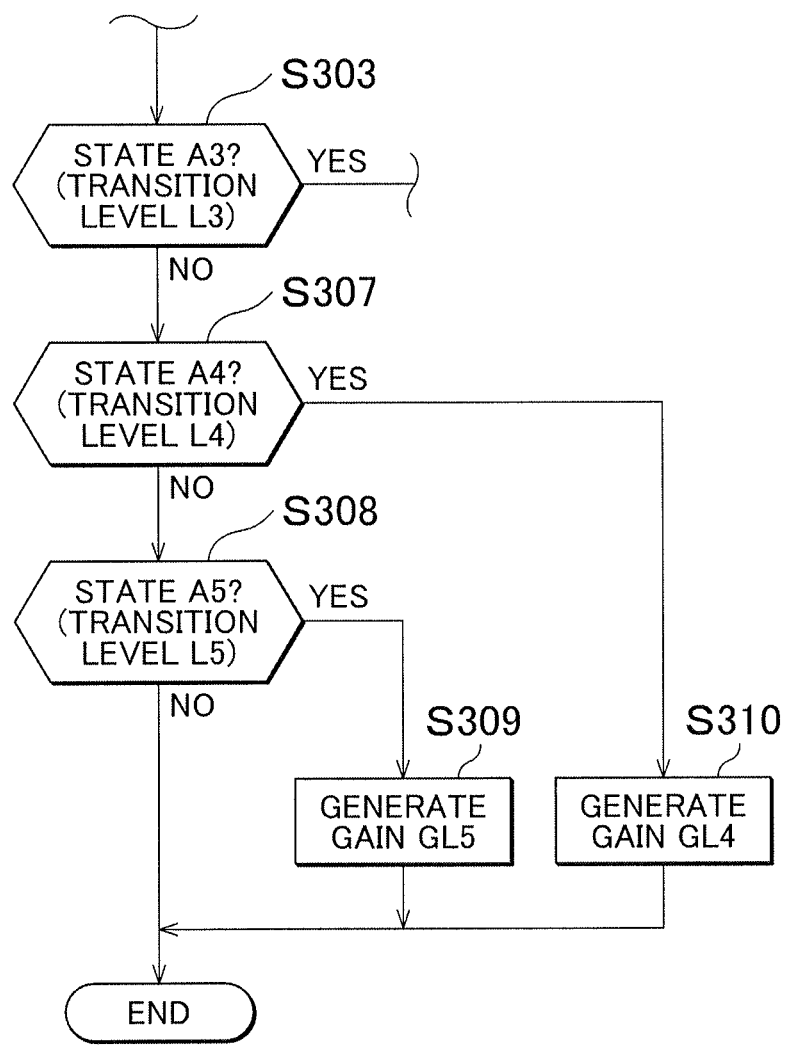
FIG. 16B is a flowchart illustrating the process procedure for a transition level determination circuit according to a modification of the second embodiment.

As illustrated in the flowchart of FIG. 16B, when the transition level determination circuit 77 judges in step S303 described earlier that the state of the primary assist control amount Ias* is not the state A3 (NO in step S303), the process proceeds to step S307.

In step S307, the transition level determination circuit 77 judges whether or not the state of the primary assist control amount Ias* is the state A4. When the transition level determination circuit 77 judges that the state of the primary assist control amount Ias* is not the state A4 (NO in step S307), the process proceeds to step S308.

In step S308, the transition level determination circuit 77 judges whether or not the state of the primary assist control amount Ias* is the state A5. When the transition level determination circuit 77 judges that the state of the primary assist control amount Ias* is not the state A5 (NO in step S308), the process is ended.

When it is judged in step S308 described earlier that the state of the primary assist control amount Ias* is the state A5 (YES in step S308), in contrast, the transition level determination circuit 77 generates a gain GL5 as the transition level gain GL (step S309), and the process is ended.

When it is judged in step S307 described earlier that the state of the primary assist control amount Ias* is the state A4 (YES in step S307), meanwhile, the transition level determination circuit 77 generates a gain GL4 as the transition level gain GL (step S310), and the process is ended.

The magnitude relationship between the values of the two gains GL4 and GL5 is as indicated by the following formula (4):

$$0 < GL5 < GL4 < 1 \quad (4)$$

Therefore, when the state A4 or the state A5 occurs, the value of the increase amount Na retrieved by the counter 76 is smaller than the value of the increase amount Na calculated using the increase amount setting map M11. Thus, the value of the distribution gain Gs calculated using the gain setting map M12 is larger than that at normal times (in neither of the state A4 and the state A5). That is, the proportion of the primary assist control amount Ias* in the final current command value I* is higher than that at normal times, and the proportion of the secondary assist control amount Ias*sub is lower than that at normal times. In addition, the speed at which the count value N is increased, and hence the speed of transition from the primary assist control amount Ias* to the secondary assist control amount Ias*sub which is based on the distribution gain Gs, are lower than those at normal times.

When the transition level determination circuit 77 judges in step S308 that the state of the primary assist control amount Ias* is the state A5 (YES in step S308), and when the transition level determination circuit 77 judges in step S307 that the state of the primary assist control amount Ias* is the state A4 (YES in step S307), the process may be ended without generating the transition level gain GL. In this case, steering assist is continued on the basis of the primary assist control amount Ias* which has been restricted during a period until the count value N of the counter 76 reaches the abnormality determination threshold Nth. In the state A4 and the state A5, the effect on the motor torque is so slight as not to cause a significant problem.

In addition, the switching circuit 75 may be configured not to include the increase amount setting map M11. In this case, for example, the transition level gain GL and the basic increase amount Na1 are multiplied to be the increase amount Na stored in the counter 76. Also in this way, the increase amount Na is increased and decreased in accordance with the transition level gain GL.

Thus, according to the second embodiment, the following effect can be obtained.

(5) The proportion of the primary assist control amount Ias* in the final current command value I* is changed in accordance with the state of the primary assist control amount Ias* (the degree to which fluctuations in torque of the motor are affected). In addition, the speed of transition to the secondary assist control amount Ias*sub is changed in accordance with the state of the primary assist control amount Ias*. For example, as the effect on fluctuations in motor torque is larger, the transition to the secondary assist control amount Ias*sub is faster. Therefore, fluctuations in motor torque are suppressed more suitably in accordance with the state of the restricted primary assist control amount Ias*. Variations in steering behavior are also suppressed.

Next, an electric power steering system according to a third embodiment will be described. The example is different from the first embodiment in that the speed of transition from the primary assist control amount Ias* to the secondary assist control amount Ias*sub is changed in consideration of not only the steering torque τ but also variations in current to be supplied to the motor 31.

Figure 18:
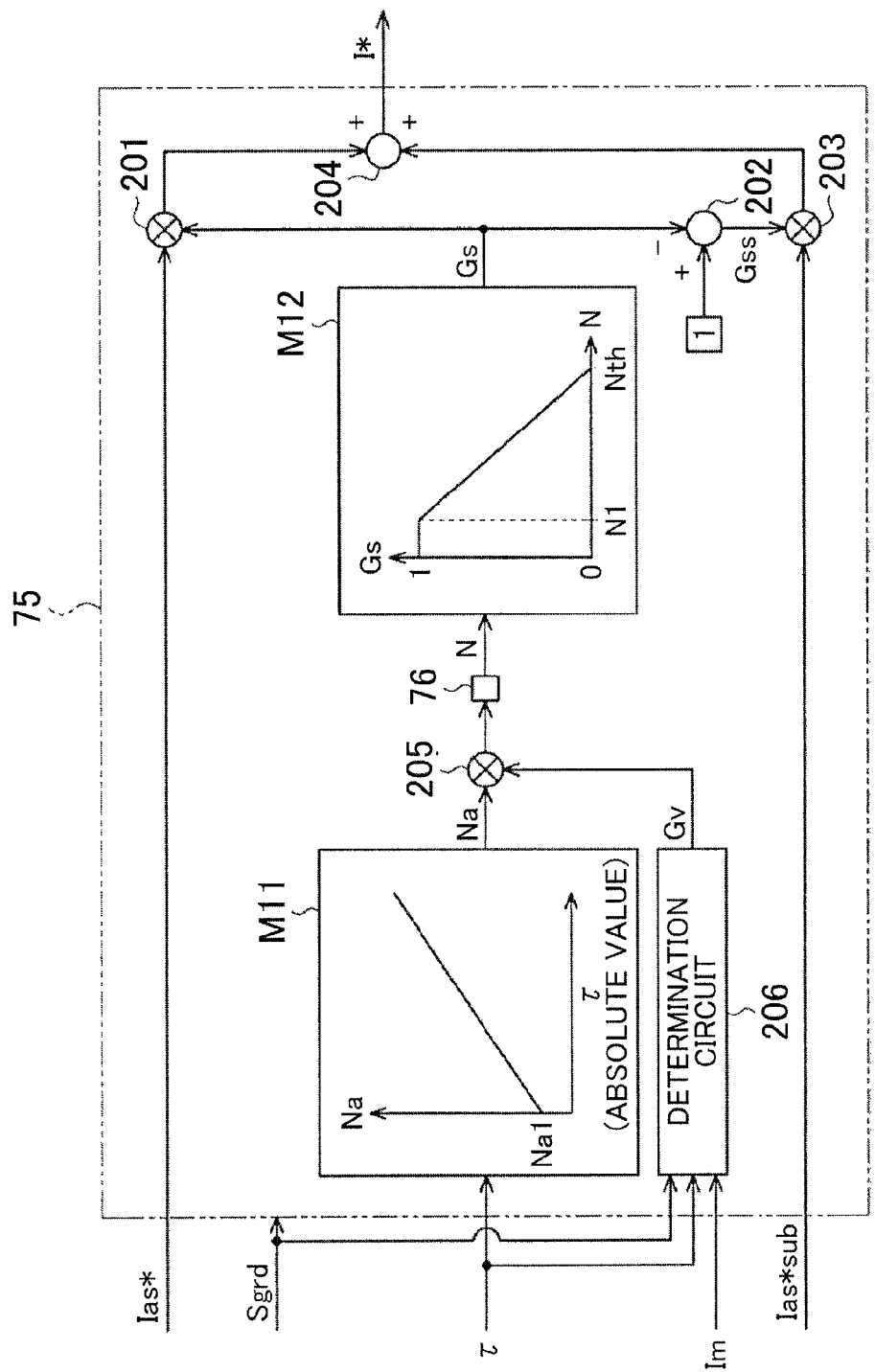
FIG. 18 is a control block diagram of a switching circuit according to the third embodiment.

As illustrated in FIG. 17, the switching circuit 75 retrieves the current value Im detected through the current sensor 44. As illustrated in FIG. 18, the switching circuit 75 includes a determination circuit 206. The determination circuit 206 retrieves the restriction state signal Sgrd, the steering torque τ, and the current value Im. When the restriction state signal Sgrd indicating that the primary assist control amount Ias* has been restricted is retrieved, the determination circuit 206 determines on the basis of the steering torque τ and the current value Im whether to make the speed of transition from the primary assist control amount Ias* to the secondary assist control amount Ias*sub higher or lower. The determination circuit 206 generates a transition speed gain GV in accordance with the result of the determination as to whether to make the transition speed higher or lower.

As illustrated in FIG. 19, the determination circuit 206 determines on the basis of the direction of variation (whether the sign is positive or negative) in the steering torque τ and the direction of variation (whether the sign is positive or negative) in the current value Im whether or not the current to be supplied to the motor 31 is a current in the direction of increasing variations in the steering torque τ (YES/NO).

Specifically, the determination circuit 206 computes a variation value Δτ of the steering torque τ as the direction of variation in the steering torque τ. The variation value Δτ of the steering torque τ is obtained by subtracting the previous steering torque τ from the present steering torque τ. In addition, the determination circuit 206 computes a variation value ΔIm of the current value Im as the direction of variation in the current value Im. The variation value ΔIm of the current value Im is obtained by subtracting the previous current value Im from the present current value Im.

When the sign of the product of the variation value Δτ of the steering torque τ and the variation value ΔIm of the current value Im is positive (+) as indicated by the formula (5), the determination circuit 206 determines that the current to be supplied to the motor 31 is not a current in the direction of increasing variations in the steering torque τ (NO determination). When the sign of the product of the variation value Δτ of the steering torque τ and the variation value ΔIm of the current value Im is negative (−) as indicated by the formula (6), on the contrary, the determination circuit 206 determines that the current to be supplied to the motor 31 is a current in the direction of increasing variations in the steering torque τ (YES determination).

$$\Delta\tau \times \Delta Im > 0 \quad (5)$$

$$\Delta\tau \times \Delta Im < 0 \quad (6)$$

When it is determined that the current to be supplied to the motor 31 is a current in the direction of increasing variations in the steering torque τ (YES determination), the determination circuit 206 generates a gain GVH as the transition speed gain GV for increasing the transition speed. When it is determined that the current to be supplied to the motor 31 is not a current in the direction of increasing variations in the steering torque τ (NO determination), the determination circuit 206 generates a gain GVL as the transition speed gain GV for reducing the transition speed. The gain GVH is set to a value that is larger than one, and the gain GVL is set to a value that is smaller than one.

Combinations between the direction of variation (whether the sign is positive or negative) in the steering torque τ and the direction of variation (whether the sign is positive or negative) in the current value Im include the following four patterns (D1) to (D4):

(D1) When the direction of variation in the steering torque τ is positive (+) and the direction of the current value Im is also positive (+). At this time, the sign of the product of the variation value Δτ of the steering torque τ and the variation value ΔIm of the current value Im is positive (+). Therefore, it is determined that the current to be supplied to the motor 31 is not a current in the direction of increasing variations in the steering torque τ (NO determination). Thus, the gain GVL for reducing the transition speed is generated.

(D2) When the direction of variation in the steering torque τ is positive (+) and the direction of the current value Im is negative (−). At this time, the sign of the product of the variation value Δτ of the steering torque τ and the variation value ΔIm of the current value Im is negative (−). Therefore, it is determined that the current to be supplied to the motor 31 is a current in the direction of increasing variations in the steering torque τ (YES determination). Thus, the gain GVH for increasing the transition speed is generated.

(D3) When the direction of variation in the steering torque τ is negative (−) and the direction of the current value Im is positive (+). At this time, the sign of the product of the variation value Δτ of the steering torque τ and the variation value ΔIm of the current value Im is negative (−). Therefore, it is determined that the current to be supplied to the motor 31 is a current in the direction of increasing variations in the steering torque τ (YES determination). Thus, the gain GVH for increasing the transition speed is generated.

(D4) When the direction of variation in the steering torque τ is negative (−) and the direction of the current value Im is also negative (−). At this time, the sign of the product of the variation value Δτ of the steering torque τ and the variation value ΔIm of the current value Im is positive (+). Therefore, it is determined that the current to be supplied to the motor 31 is not a current in the direction of increasing variations in the steering torque τ (NO determination). Thus, the gain GVL for reducing the transition speed is generated.

The transition speed may not be varied when it is determined that the current to be supplied to the motor 31 is not a current in the direction of increasing variations in the steering torque τ (NO determination). In this case, the value of the gain GVL may be set to one.

Thus, according to the third embodiment, the following effects can be obtained.

(6) When the current to be supplied to the motor 31 is a current in the direction of increasing variations in the steering torque τ, the speed of transition from the primary assist control amount Ias* which has been restricted to the secondary assist control amount Ias*sub is made higher than that at normal times. It is possible to relieve the effect of an increase in variation amount of the steering torque τ on the steering behavior by an amount by which switching is made faster from the primary assist control amount Ias* which has been restricted to the secondary assist control amount Ias*sub.

(7) When the current to be supplied to the motor 31 is not a current in the direction of increasing variations in the steering torque τ, it is not necessary to positively increase the speed of transition from the primary assist control amount Ias* which has been restricted to the secondary assist control amount Ias*sub. In some cases, rather, it is considered to be preferable to continuously use the primary assist control amount Ias*, even if restricted. Examples of such cases include a case where the secondary assist control circuit 74 has a function simplified compared to that of the primary assist control circuit 71. In such a case, it is desirable to use the assist control amount Ias* generated by the primary assist control circuit 71 as much as possible.

Next, an electric power steering system according to a fourth embodiment will be described. The embodiment can be applied to any of the first to third embodiments described earlier.

Figure 20:
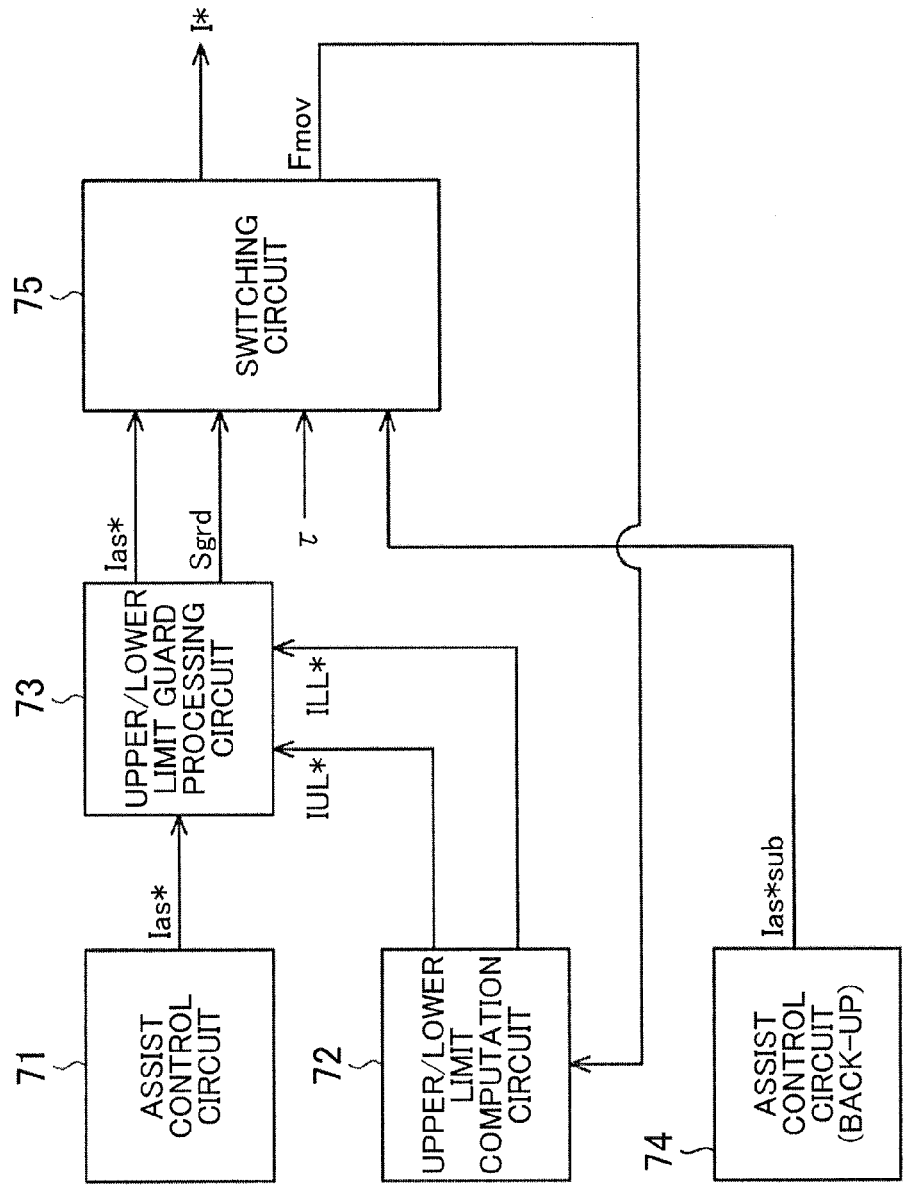
FIG. 20 is a control block diagram illustrating an essential portion of a current command value computation circuit according to a fourth embodiment.

As illustrated in FIG. 20, the switching circuit 75 generates a transition flag Fmov at the timing when transition from the primary assist control amount Ias* to the secondary assist control amount Ias*sub is started. The transition flag Fmov is a signal indicating that transition from the primary assist control amount Ias* to the secondary assist control amount Ias*sub has been started. The upper/lower limit computation circuit 72 retrieves the transition flag Fmov generated by the switching circuit 75.

Figure 21:
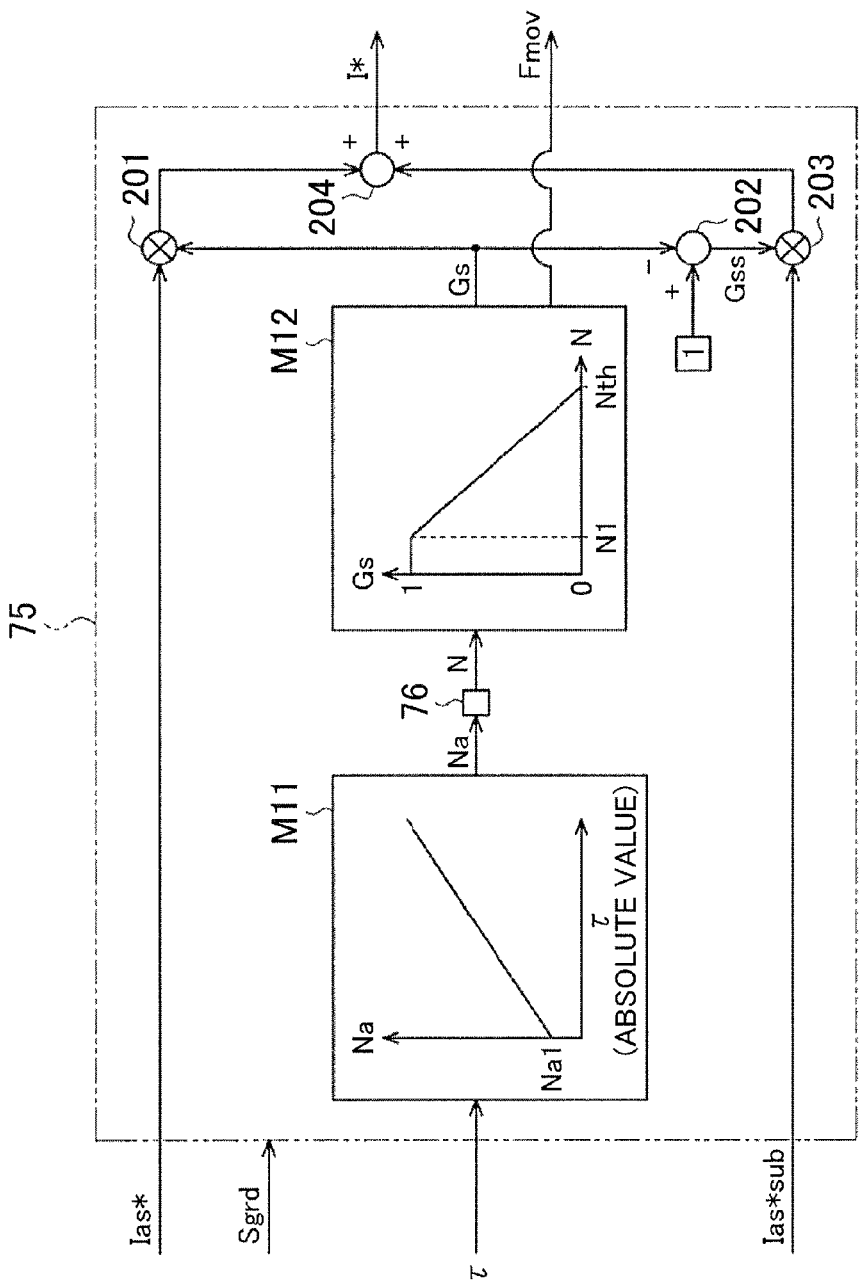
FIG. 21 is a control block diagram of a switching circuit according to the fourth embodiment.

As illustrated in FIG. 21, the gain setting map M12 of the switching circuit 75 generates a transition flag Fmov when the count value N of the counter 76 reaches a predetermined threshold N1 (<Nth) as the timing when transition from the primary assist control amount Ias* to the secondary assist control amount Ias*sub is started. The distribution gain Gs has a value less than one after the count value N exceeds the predetermined threshold N1. The predetermined threshold N1 functions as a timing determination threshold that serves as a criterion for determining the timing to generate the transition flag Fmov.

Figure 22:
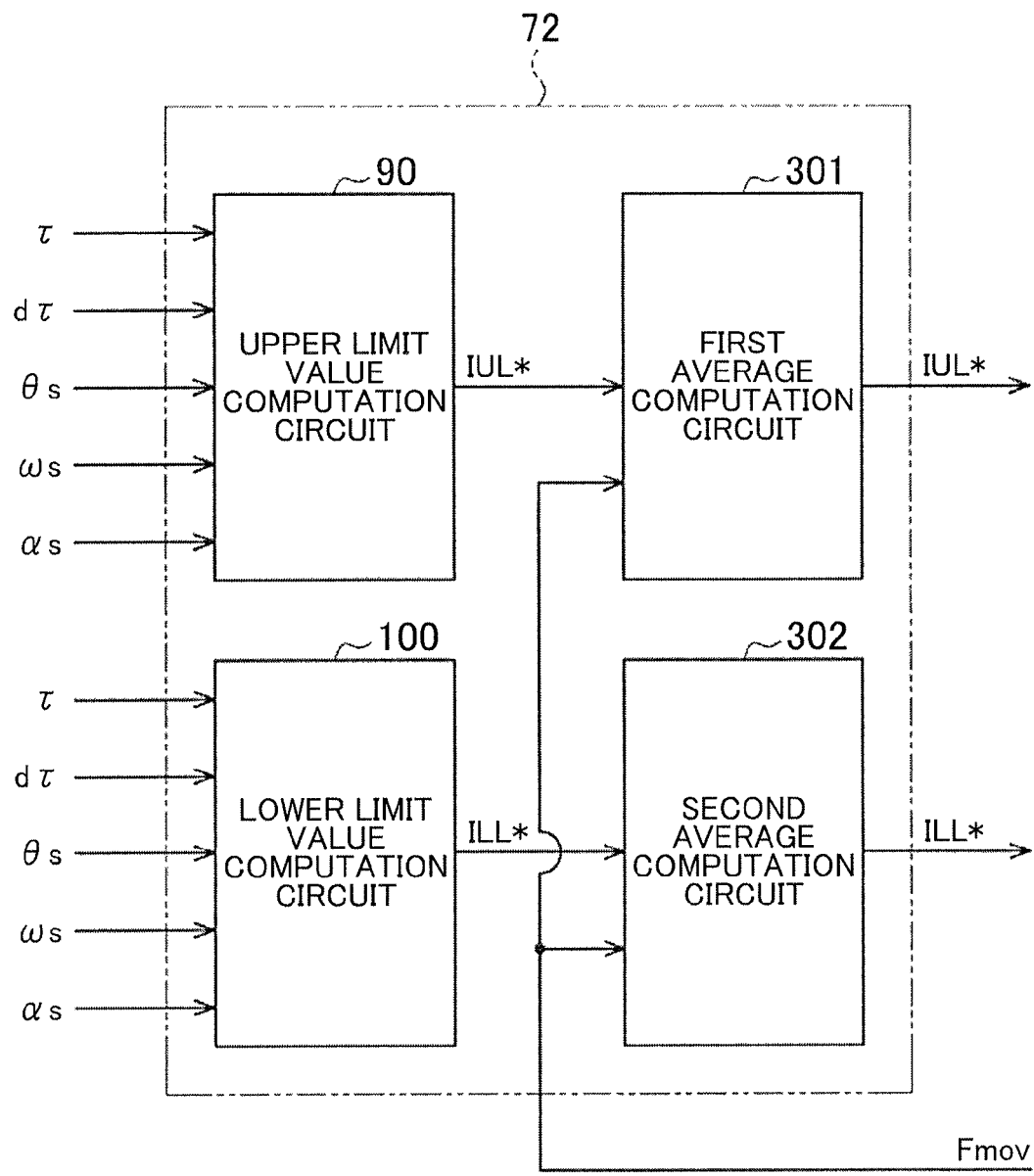
FIG. 22 is a control block diagram of an upper/lower limit computation circuit according to the fourth embodiment.

As illustrated in FIG. 22, the upper/lower limit computation circuit 72 includes a first average computation circuit 301 and a second average computation circuit 302. When the transition flag Fmov is retrieved, the first average computation circuit 301 computes a time average of the upper limit value IUL* generated by the upper limit value computation circuit 90, and outputs the computed time average to the upper/lower limit guard processing circuit 73 as the final upper limit value IUL*. When the transition flag Fmov is not retrieved, the first average computation circuit 301 outputs the upper limit value IUL* computed by the upper limit value computation circuit 90 as it is to the upper/lower limit guard processing circuit 73 as the final upper limit value IUL*.

When the transition flag Fmov is retrieved, the second average computation circuit 302 computes a time average of the lower limit value ILL* generated by the lower limit value computation circuit 100, and outputs the computed time average to the upper/lower limit guard processing circuit 73 as the final lower limit value ILL*. When the transition flag Fmov is not retrieved, the second average computation circuit 302 outputs the lower limit value ILL* computed by the lower limit value computation circuit 100 as it is to the upper/lower limit guard processing circuit 73 as the final lower limit value ILL*.

When transition from the primary assist control amount Ias* to the secondary assist control amount Ias*sub is completed, the switching circuit 75 may stop computation of the time average of the upper limit value IUL* and the time average of the lower limit value ILL*. To be exact, the gain setting map M12 of the switching circuit 75 stops generation of the transition flag Fmov when the count value N reaches the abnormality determination threshold Nth and the value of the distribution gain Gs reaches zero. When generation of the transition flag Fmov is stopped, computation of the averages performed by the first average computation circuit 301 and the second average computation circuit 302 is also stopped. In this way, unnecessary computation processes are reduced. When transition from the primary assist control amount Ias* to the secondary assist control amount Ias*sub is completed, in addition, operation of at least one of the primary assist control circuit 71, the upper/lower limit computation circuit 72, and the upper/lower limit guard processing circuit 73 may be stopped.

Thus, according to the fourth embodiment, the following effects can be obtained.

(8) When the assist control amount Ias* to be used transitions from the primary assist control amount Ias* to the secondary assist control amount Ias*sub, the primary assist control amount Ias* which is restricted to the upper limit value IUL* or the lower limit value ILL* may be fluctuated because of fluctuations in the upper limit value IUL* or the lower limit value ILL*. In the example, in this respect, the time average of the upper limit value IUL* and the time average of the lower limit value ILL* are used as the final upper limit value IUL* and lower limit value ILL* when a transition is made from the primary assist control amount Ias* to the secondary assist control amount Ias*sub. Therefore, fluctuations in the final upper limit value IUL* and lower limit value ILL*, and hence fluctuations in the primary assist control amount Ias* which is restricted to the upper limit value IUL* or the lower limit value ILL*, are suppressed. Thus, fluctuations in torque of the motor 31, and hence variations in steering behavior, are also relieved.

(9) When transition from the primary assist control amount Ias* to the secondary assist control amount Ias*sub is completed, computation of at least the time average of the upper limit value IUL* and the time average of the lower limit value ILL* may be stopped, which reduces unnecessary computation processes.

What is claimed is:

1. An electric power steering system comprising:
    a control device
        that computes an assist control amount on the basis of a plurality of types of state amounts indicating a steering state of a steering system of a vehicle, and
        that controls a motor that serves as a generation source of an assist force to be applied to a steering mechanism of the steering system of the vehicle on the basis of the assist control amount, wherein
    the control device executes
        a restriction process of setting a restriction value restricting a variation range to which the assist control amount is restricted, individually for each of the state amounts, in accordance with each state amount used to compute the assist control amount, and of restricting a value of the assist control amount using the restriction value to produce a restricted first assist control amount, and
        a switching process for causing the assist control amount to transit from a first assist control amount, which is the restricted first assist control amount, to a second assist control amount, which is computed separately from the first assist control amount, when a certain time elapses since the value of the assist control amount is restricted by the restriction process, and
    the control device varies a speed of transition from the first assist control amount to the second assist control amount on the basis of an internal state of the control device.

2. The electric power steering system according to claim 1, wherein the internal state is a particular state amount, among the plurality of types of state amounts of the steering system.

3. The electric power steering system according to claim 2, wherein the particular state amount is a steering torque, and the control device increases the transition speed in accordance with an increase in the steering torque.

4. The electric power steering system according to claim 2, wherein the particular state amount is a steering torque, and the control device determines, on the basis of a comparison between a direction of variation in the steering torque and a direction of variation in a current to be supplied to the motor, whether or not the direction of variation in the current is a direction of increasing a variation in the steering torque, and increases and decreases the transition speed in accordance with a result of the determination.

5. The electric power steering system according to claim 3, wherein the control device determines, on the basis of a comparison between a direction of variation in the steering torque and a direction of variation in a current to be supplied to the motor, whether or not the direction of variation in the current is a direction of increasing a variation in the steering torque, and increases and decreases the transition speed in accordance with a result of the determination.

6. The electric power steering system according to claim 2, wherein the control device determines, on the basis of at least one of the particular state amount and the restricted first assist control amount, a transition level indicating a degree to which a steering behavior of the steering system is affected by the first assist control amount, and varies the transition speed in accordance with the determined transition level.

7. The electric power steering system according to claim 3, wherein the control device determines, on the basis of at least one of the particular state amount and the restricted first assist control amount, a transition level indicating a degree to which a steering behavior of the steering system is affected by the first assist control amount, and varies the transition speed in accordance with the determined transition level.

8. The electric power steering system according to claim 4, wherein the control device determines, on the basis of at least one of the particular state amount and the restricted first assist control amount, a transition level indicating a degree to which a steering behavior of the steering system is affected by the first assist control amount, and varies the transition speed in accordance with the determined transition level.

9. The electric power steering system according to claim 1, wherein the internal state is a result of a determination made as to whether or not a steering behavior of the steering system is affected by execution of the restriction process.

10. The electric power steering system according to claim 9, wherein the control device determines, on the basis of at least one of a particular state amount among the plurality of types of state amounts of the steering system and the restricted first assist control amount, a transition level indicating a degree to which the steering behavior of the steering system is affected by execution of the restriction process, and varies the transition speed in accordance with the determined transition level.

11. The electric power steering system according to claim 9, wherein
    the internal state is a particular state amount, among the plurality of types of state amounts of the steering system, the particular state amount is a steering torque, and the control device determines, on the basis of a comparison between a direction of variation in the steering torque and a direction of variation in a current to be supplied to the motor, whether or not the direction of variation in the current is a direction of increasing a variation in the steering torque as a process for determining whether or not the steering behavior of the steering system is affected by execution of the restriction process, and increases and decreases the transition speed in accordance with a result of the determination.

12. The electric power steering system according to claim 10, wherein the particular state amount is a steering torque, and the control device determines, on the basis of a comparison between a direction of variation in the steering torque and a direction of variation in a current to be supplied to the motor, whether or not the direction of variation in the current is a direction of increasing a variation in the steering torque as a process for determining whether or not the steering behavior of the steering system is affected by execution of the restriction process, and increases and decreases the transition speed in accordance with a result of the determination.

13. The electric power steering system according to claim 1, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

14. The electric power steering system according to claim 3, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

15. The electric power steering system according to claim 4, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

16. The electric power steering system according to claim 6, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

17. The electric power steering system according to claim 9, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

18. The electric power steering system according to claim 10, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

19. The electric power steering system according to claim 11, wherein the control device adds a plurality of restriction values set individually for each of the state amounts to generate a final restriction value for the assist control amount, and the control device restricts the first assist control amount using a time average of the final restriction value during a period since the transition from the first assist control amount to the second assist control amount is started until the transition is completed.

* * * * *